US005760773A

United States Patent [19]

Berman et al.

[11] Patent Number: 5,760,773
[45] Date of Patent: Jun. 2, 1998

[54] METHODS AND APPARATUS FOR INTERACTING WITH DATA OBJECTS USING ACTION HANDLES

[75] Inventors: Eric Robert Berman, Redmond; Edward Low Mills, Bellevue; Michael Hinkley Van Kleeck, Duvall; Vinayak A. Bhalerao, Redmond, all of Wash.

[73] Assignee: Microsoft Corporation, Redmond, Wash.

[21] Appl. No.: 369,688

[22] Filed: Jan. 6, 1995

[51] Int. Cl.[6] .................................................. G06F 3/00
[52] U.S. Cl. ........................................... 345/347; 345/121
[58] Field of Search ................................ 395/155, 159, 395/156, 161, 146, 133, 347, 339, 348, 354, 352, 334, 335; 345/145, 146, 121, 347, 339, 348, 354, 352, 334, 335, 433

[56] References Cited

U.S. PATENT DOCUMENTS

| 5,196,838 | 3/1993 | Meier et al. | 345/118 |
|---|---|---|---|
| 5,345,543 | 9/1994 | Capps et al. | 345/437 |
| 5,347,295 | 9/1994 | Agulnick et al. | 345/156 |
| 5,367,453 | 11/1994 | Capps et al. | 707/531 |
| 5,390,281 | 2/1995 | Luciw et al. | 395/12 |
| 5,396,590 | 3/1995 | Kreegar | 345/347 |
| 5,450,539 | 9/1995 | Ruben | 345/354 |
| 5,513,309 | 4/1996 | Meier et al. | 345/339 |
| 5,515,496 | 5/1996 | Kaehler et al. | 345/334 |
| 5,570,281 | 10/1996 | Berry | 364/146 |

*Primary Examiner*—Matthew M. Kim
*Assistant Examiner*—Crescelle N. dela Torre
*Attorney, Agent, or Firm*—Jones & Askew, LLP

[57] ABSTRACT

A central processing unit (CPU) is coupled to a computer display for displaying graphic and other information. The CPU is further coupled to a pointer control device such as a pen, stylus or mouse that permits the user to selectively position a pointer and activate an action handle on the display associated with a data object. Activation of the action handle signals the CPU of selections associated with the data object. Tapping or clicking on the action handle causes display of a context menu containing at least one command that may be invoked with respect to the data object. Dragging the action handle indicates movement or dragging of the action handle and the corresponding data object for an operation associated with dragging such as drag-and-drop. The use of action handles in association with data objects eliminates ambiguity between actions intended to create digital ink with respect to a pen-based computer system and actions intended to invoke a command or other interaction with the computer system.

30 Claims, 12 Drawing Sheets

EXEMPLARY STATIC ACTION HANDLES

EXEMPLARY DRAG ICONS
(DYNAMIC OR STATUS INDICATING ACTION HANDLES

100

| CLASS: RECTANGLE | | |
|---|---|---|
| INSTANCE VARIABLES: | | |
| UPPER LEFT | CORNER | LINEWIDTH |
| UPPER RIGHT | CORNER | FILLPATTERN |
| LOWER LEFT | CORNER | |
| LOWER RIGHT | CORNER | |
| MESSAGES: | METHODS: | |
| DRAW | DRAW LINE FROM POINT TO POINT | |
| ERASE | ERASE LINES | |
| MOVE | TRANSLATE OR OFFSET CORNER POINTS | |

FIG.12

METHODS AND APPARATUS FOR INTERACTING WITH DATA OBJECTS USING ACTION HANDLES

TECHNICAL FIELD

The present invention relates generally to apparatus and methods for displaying and manipulating information on a computer display screen, and more particularly relates to a computer controlled display system for displaying action handles or icons associated with varying types of data objects on a display screen, and for allowing user interaction with selected data objects by way of the action handles or icons.

BACKGROUND OF THE INVENTION

Present day computer systems often employ "object-oriented" displays with icons, pictures, text, pop-up or drop-down menus, dialog boxes, and other graphical items or objects in what is known as a "Graphical User Interface" or "GUI". In such systems, various combinations of graphical items or objects are utilized to convey information to users via a cathode ray tube (CRT) monitor or display. Users generally interact with the computer system by activating graphical items or objects on the display. The graphical items or objects are often activated by pointing at them with a mouse, pen, or other pointing device, and clicking or tapping a button.

Object oriented display systems often utilize small graphical items or objects called "icons", which symbolically indicate a type of operation the computer system will execute if the icon is selected by a user interface device such as a mouse, pen, or keyboard. These icons are frequently disposed within a window on a display. Icons are often used to delete or copy information, move information from one window to another, cause operations to the data in the window, and the like. An example of a computer graphical user interface that uses icons is the Microsoft WINDOWS™ operating system manufactured by the assignee of the present invention, Microsoft Corporation.

New generations of computer systems that use a pen or stylus as a user input device are being introduced. Some of the new pen-based computers are small, handheld devices with a display screen but no keyboard. Such devices are sometimes called "Personal Digital Assistants", "PDAs", or "portable pen pads". With such devices, a user interacts with a display screen like a sheet of paper, using an ink-less pen or stylus to draw pictures, to enter text via handwriting or printing, and to interact with the computer system. The computer interprets the motion of the pen or stylus relative to the display screen, and often displays lines or markings on the screen that track the movement of the pen. Markings on the screen displayed as a result of movement of the stylus are often called "digital ink".

The pen or stylus in a pen-based computing system may be considered a "direct pointing device", that is, a pointing device consisting of a display and an indicator such as a finger, stylus, or other object. The pointing-device actions of "pointing" and "tapping"—which are analogous to "clicking" with a mouse—are achieved by moving the indicator on or near the display screen and touching the display screen, respectively. With a mouse or trackball type pointing device, there is an indirection. The user moves some physical device (positioned somewhere away from the screen) in order to move an artificial pointer (i.e. a cursor) on the display screen. Without the cursor, there is no way for the user to "see where you are" on the screen. With a direct pointing device, the "where you are" is represented by the indicator itself, and, optionally, by a cursor.

Because there is no keyboard or mouse, pen-based computers have tighter restrictions on what a user can and cannot do. Common user interfaces such as those is found in the Microsoft WINDOWS™ operating system and other GUI-based computer systems typically rely on a keyboard and a pointing device with buttons such as a mouse or trackball for user interaction. The user points to a location on the screen where an action is desired, and invokes a command by pressing a button on the pointing device or entering a keyboard command. For example, to insert a space between words it is generally assumed the user can simply select a location for insertion of the space by using the mouse to position a cursor at the point of insertion and hit the space bar. Consequently, many present-day application software programs do not offer an "insert space" command for text editing.

Some known computer application programs add commands to existing drop-down menu bars. However, this method is not suitable for handheld pen-based applications since most menu bars are impractically large on devices with a small screen.

Therefore, systems that are required to work with a pen or stylus must find alternative methods to accomplish such actions.

In pen-based computers, it is difficult for the computer to distinguish actions of a user intended as digital ink from actions intended to invoke operations of or provide commands to the computer system. It is desirable that a user interface for a pen-based computer system be able to interpret movement of the stylus in a consistent, unambiguous fashion, so that users can enter data or invoke commands quickly and without frustration. It is also important that the user interface be intuitive and easy to remember, so that the user can readily determine how to tell the computer that he or she intends to invoke a command, or make digital ink (e.g. enter text via handwriting)

One example of a known pen-based computer system is the Newton™ MessagePad™ manufactured by Apple Computer, Inc., Cupertino, Calif. This device is a small, hand-held device with a liquid crystal display (LCD) screen, no keyboards or buttons (other than an on-off switch), and a stylus that is used to interact with the system. The user manipulates the stylus to enter handwriting, tap on regions of the screen, or draw pictures. The Apple Newton attempts to interpret patterns of markings by the stylus on the screen or "gestures" as commands. A gesture is a symbol or pattern of markings that the user can draw with a stylus (or finger) that is recognized by the system as a command, rather than as text or a picture.

For example, in the Apple Newton a squiggly gesture made on top of a word like this: w̰o̰r̰d̰ means "delete this" and (if interpreted properly) causes the deletion of the object or text upon which the squiggly mark was drawn. However, the computer might interpret the marking as the character "W", and the result would be a misspelled word "wordW".

Likewise, a caret gesture like this: too^close means to "insert space". Moreover, the user must remember that a squiggly gesture means "delete", and that a caret gesture means "insert", since there is no readily apparent means for telling the user what the gestures are if forgotten.

Stated in other words, gestures are "hidden" from the user and can be ambiguous. That is, there is no way for a user to determine what particular gesture to draw when a particular command is desired, except to be told or remembered. Once learned, however, gestures can be easily forgotten, if not repeatedly used. Another disadvantage is that of recognition. Gestures can be and frequently are misrecognized. The results of a misrecognized gesture range from simple annoyance to unintended loss of data.

Even with traditional keyboard and/or mouse-type graphical user interfaces, there is sometimes ambiguity as to the function of an icon or the manner for invoking a command for a data object displayed on screen. For example, in a mouse-driven GUI, if users wish to delete a word from within a sentence, they must remember that they must (1) first select the word to be deleted by pointing and dragging the cursor (thereby forming a "selected data object") and (2) then invoke the appropriate "delete" command by either (a) remembering the keyboard equivalent command, (b) finding the command from a drop-down or pop-up menu which may be remotely located on the screen relative to the selected data object, or (c) activate a disassociated "delete" icon somewhere on the screen, assuming they can find it.

While all of such methods (keyboard command, menu command, icon command) are presently employed with success in modern application computer programs, it would advance the art of GUI design if the object itself upon which an action is desired could provide the user with the options to invoke actions in a concise, consistent and uniform methodology. Such an advance would not force users to remember keyboard commands, locate commands in menu located away from the object, or locate appropriate action icons located remotely from the object. In yet other words, it would be desirable that selected data objects themselves provide a context for prompting and receiving user interaction.

In order to reduce ambiguity to some degree, some application programs for the Apple Newton Message Pad system employ fixed-position icons that display pop-up menus of selectable items when tapped. (A "tap" is a form of gesture wherein the user lightly strikes a spot on the display screen with the stylus.) These fixed-position icons are typically a small, diamond shaped region (e.g. ♦) whose very shape signifies that it is a "hot spot". It has proven easy for users to remember that the diamond icon means "tap here for display of selectable options."

However, such pop-up menus are associated with a series of selectable items, and are not context-sensitive. There is no predictable one-to-one connection between an object and an icon. In other words, selected data objects themselves do not provide a context for prompting and receiving user interaction. Moreover, such pop-up menu icons do not completely duplicate gesture functionality, and cannot be moved or repositioned.

It is expected that the use of pen-based computing systems will increase in the foreseeable future because of the flexibility afforded by such systems to people who either cannot or do not wish to type using a keyboard. Moreover, pen-based computers offer the advantage of greater portability since no keyboards or pointing devices are required other than a simple stylus. It is foreseen that even future desktop computer systems may utilize flat panel display screens that serve both as an upright display when a user wishes to use a keyboard and/or mouse for interaction, but may also be removed from a stand, placed in a lap or on a desktop, and employed like "digital paper" with a stylus, as the user enters "digital ink". Therefore, there is a need for computer operating systems that offer increased command accessibility and reduced ambiguity, especially for pen-based computer systems, but for that matter with any types of computer systems that rely upon undiscoverable or easily forgettable actions that are associated with particular icons.

SUMMARY OF THE INVENTION

The present invention overcomes the foregoing described difficulties with present computer user interface design by providing action handles or icons in association with data objects, typically displayed in close proximity to a related data object displayed on the screen. The action handles provide a method for performing actions on text and other data objects with a pen or other pointing device, and also a method for displaying a context menu for the text or other objects. A context menu, for purposes of the present application, is a menu of commands that apply to only a particular object within a particular context, and that pops up on screen over, or in proximity to the particular object.

Briefly described, the present invention comprises computer systems and methods that comprise displaying a small icon or "action handle" next to or in close proximity to a data object, such as a selected text item, or a calendar item, or a list of other data items, or at an insertion point within a range of text. The action handles receive event messages indicative of a tapping or dragging action with a stylus or other pointing device such as a mouse. In response to a tapping action, preferably a context menu displaying commands available for the object or text is displayed. In further response to selection of a command in the context menu, the system carries out the appropriate selected command. In response to a dragging action, preferably the selected object is moved to a new location.

For example, an action handle next to an address in an address book can be dragged to copy or move the address to another application, for example, to an electronic mail ("e-mail") application to send mail to a person. Or, the action handle can be tapped to cause display of the context menu that offers commands that are appropriate in a given context, such as "delete", "print", or "edit", that act on the address.

As another example, the action handle associated with a selected text data object might be used to move the text around by dragging, and might contain commands in its context menu such as "delete", "make upper case", "make bold face". Similarly, an action handle associated with an insertion point (which may include a draggable cursor) can be dragged to select text, which then yields an action handle associated with the selected text. The selected text action handle itself, like the draggable cursor action handle, can be tapped to reveal commands such as "insert space" or "start new line".

Preferably, the action handle will contain graphical information to assist in identifying the object in question. For example, the action handle for an address item in an address book might look like a business card.

More particularly described, the present invention relates to methods and systems for displaying and controlling actions relating to a data object displayed on a display in a computer controlled display system having a display coupled to a central processing unit (CPU). The methods and systems include the steps of generating a graphic image associated with the data object on the display, and generating a graphic image of an action handle proximate to the data object. An activatable region on the display associated with the action handle graphic image is provided. A user positions a pointer on the display using a pointing control device operatively associated with the CPU, which thereby provides a signal to the CPU upon correspondence of the pointer with the activatable region. In response to a signal indicative of a first type of interaction between the pointer and the activatable region, the method involves displaying at least one selectable command relating to the data object. In response to signal indicative of a second type of interaction between the pointer and the activatable region, the method involves moving the graphic image of the data object on the display.

In the preferred embodiment, the first type of interaction is a tap, while the second type of interaction is a drag. These types of interactions are particularly suitable for pen-based computer systems.

The preferred step of displaying at least one selectable command comprises displaying a context menu on the display including a plurality of selectable commands. In the context menu, there is provided an activatable second region on the display associated with the selectable command. In response to interaction between the second region and the pointer, a computer command corresponding to the selectable command is executed. Preferably, again, the interaction between the pointer and the second region comprises a tap.

Still more particularly described, the step of moving the graphic image of the data object on the display comprises moving the graphic image of the action handle on the display during a dragging operation from a first position to a second position on the display. In response to a release command provided at the second position on the display (typically by withdrawing the pen or stylus from the display screen), a predetermined operation is carried out, e.g. the graphic image of the data object is moved to a new position on the display associated with the second position, or if the object is "dropped" onto a clip box region, the data object is copied.

In the invention, the data object may be a data item associated with a predetermined application program. For example, the data item could be a selected string of text associated with a text processing application program, or a calendar entry associated with a calendar application program.

It will be appreciated that the invention has utility for both pen-based and mouse-based (e.g. desktop) computer systems. Advantageously, action handles are very discoverable and cannot be forgotten since they are always displayed in association with the data object. To find out what command are available in the context of a particular object, the user can simply tap on the action handle to display the context menu, and then selects an appropriate command from the list of choices in the context menu. Execution of a command in the context menu operates like other menus.

Action handles also have no ambiguity about them. The actions available at any given time are always displayed by tapping the action handle to reveal the context menu, and if the item is movable, the action handle icon, as it is dragged with the stylus or pointing device on the screen, can change its graphical properties to indicate that movement is permitted. If movement is not permitted, the action handle simply never moves or pops back to the original location, indicating non-movability to a particular location. This would be handy in applications wherein a particular data item cannot be discarded, as when a user attempts to drag the non-discardable data object to the trash can or a delete icon, and the icon pops back to its location original.

Action handles therefore eliminate the need for gestures. Action handles always provide a visible place where the stylus always acts as a pointing device rather than as a pen (that is, no digital ink is created when touching an action handle). In text entry areas, mouse operations such as drag-and-drop and selection are very difficult for a computer to distinguish from inking and writing operations. Action handles solve this problem.

It will thus be appreciated that action handles work with any type of pointing device, and provide a mechanism whereby a user can readily determine that an action is possible. This solves the problem of creating context menus in computer application programs that rely upon a "right mouse" button (for which fingers and pens have no analog) for activation of a context menu. With an action handle, there is always a visible indication of what a user can click or tap on to get a context menu.

The action handle upon its creation can indicate a visible encapsulation of an object being manipulated. In other words, the icon can represent the object for actions to be taken with the object. Action handles further permit a single-tap or click method to cause display of the context menu. This contrasts with certain double-click or other multiple tap or click methodologies which are difficult for users to remember.

The action handle provides a single focus of the user's attention for all actions on an object, both dragging and command execution. Again, this helps eliminate ambiguity and promotes consistency in the user interface across different applications and through the operating system.

Action handles, as contemplated by the present invention, are automatically generated and exposed in the appropriate context. If any particular action is available for an particular object, the action handle is displayed. Thus, the user need not remember any gestures, and can always find out what action to take by either dragging the action handle or tapping the action handle. Even common insertion-point icons or cursors can automatically appear in edit controls.

Accordingly, it is an object of the present invention to provide an improved graphical user interface for computer systems.

It is another object of the present invention to provide an improved graphical user interface particularly suitable for pen-based computer systems.

It is another object of the present invention to provide an improved graphic user interface for pen-based computer systems that reduces ambiguity in the possible actions that can be taken with respect to an object displayed on a display screen.

It is another object of the present invention to provide an unambiguous method for selecting text and other objects in a pen-based computer system graphic user interface.

It is another object of the present invention to provide for an improved user interface for pen-based computers that allows a computer system to distinguish actions of a user intended as digital ink from actions intended to invoke operations of or provide commands to the computer system.

It is another object of the present invention to provide a pen-based user interface for a computer system that is able to interpret movement of a pen or stylus in a consistent, unambiguous fashion, so that users can enter data or invoke commands quickly and without frustration.

These and other objects, features, and advantages of the present invention may be more clearly understood and appreciated from a review of the following detailed description of the disclosed embodiments and by reference to the appended drawings and claims.

BRIEF DESCRIPTION OF THE DRAWING FIGURES

FIG. 12 is a table illustrating a general class of objects (a rectangle) with associated instance variables, messages, and methods, in connection with object-oriented programming.

DETAILED DESCRIPTION OF THE PREFERRED EMBODIMENTS

Figure 1:
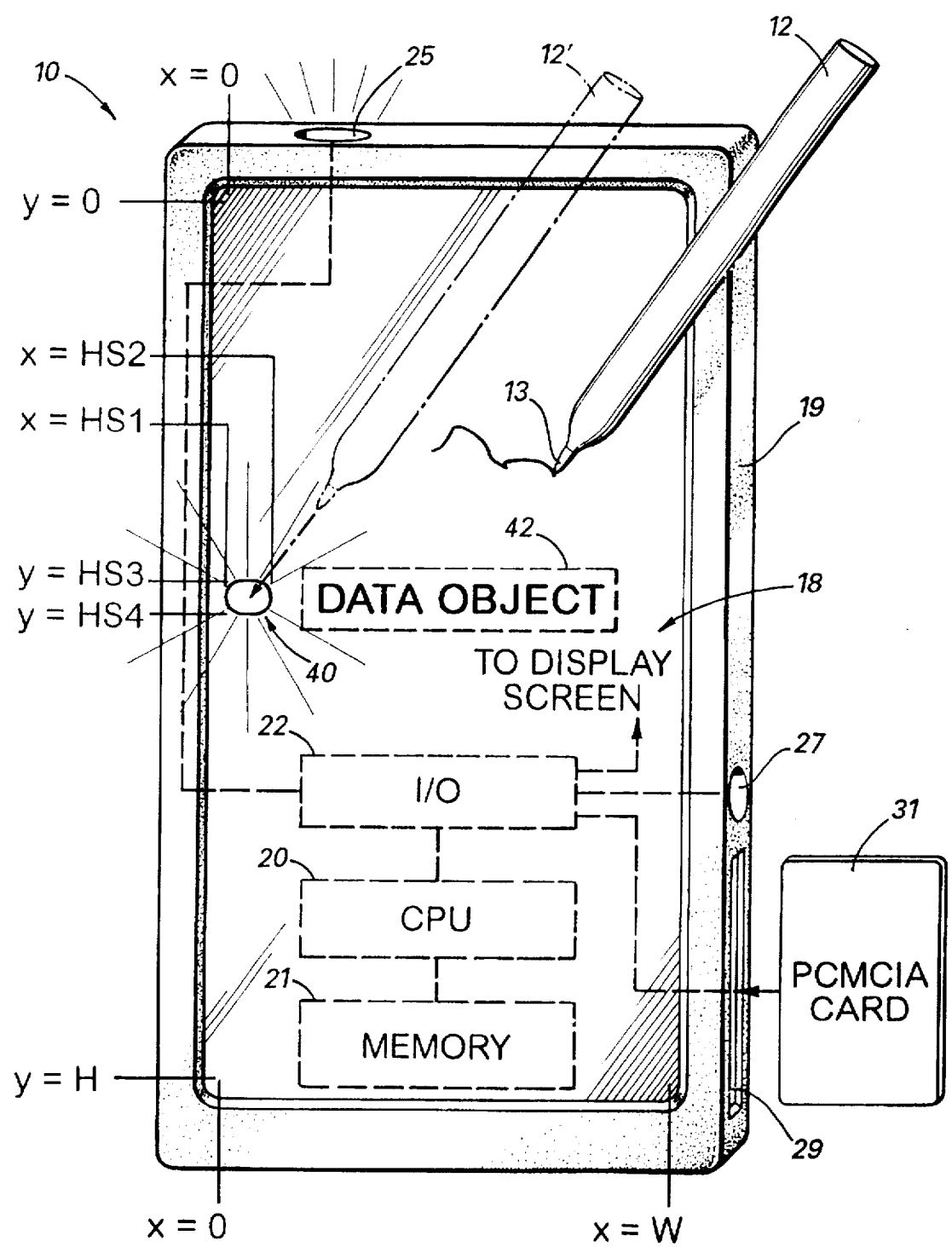
FIG. 1 illustrates the general architecture of a handheld pen-based computer that is constructed in accordance with and utilizes the teachings of the present invention to provide action handles in association with data objects.

Referring now to the drawings, in which like numerals illustrate like elements throughout the several views, FIG. 1 illustrates a pen-based computer system 10 for generating graphic images on a graphic display 18 and receiving user interactions by way of a pen or stylus 12. Although the present invention is described in conjunction with a pen-based computer, it will be appreciated that the present invention may be utilized in conventional (desk top or portable) computer systems that use a keyboard or cursor keys to position a cursor on the display screen, as well as a mouse, trackball, or other pointing device that moves a cursor on the display and often includes a switchbutton to indicate a command.

In the following detailed description, numerous details are provided such as computer display system elements, object definitions, display formats, sample data, etc. in order to provide an understanding of the invention. However, those skilled in the art will understand that the present invention may be practiced without the specific details. Well-known circuits, programming methodologies, and structures are utilized in the present invention but are not described in detail in order not to obscure the present invention.

Certain of the detailed descriptions which follow are presented in terms of exemplary display images, algorithms, and symbolic representations of operations of data bits within the computer's memory. As will be known to those skilled in the programming arts, and particularly those skilled in the object-oriented programming methodologies (about which more is explained later), these algorithmic descriptions, class descriptions, messages, notification descriptions, and graphic exemplary displays are the means used by those skilled in the art of computer programming and computer construction to convey teachings and discoveries to others skilled in the art.

For purposes of this discussion, an "algorithm" is generally a sequence of computer-executed steps leading to a desired result. These steps require physical manipulations of physical quantities. Usually, though not necessarily, these quantities take the form of electrical, magnetic, or optical signals that are capable of being stored, transferred, combined, compared, or otherwise manipulated. It is conventional for those skilled in the art to refer to these signals as bits, values, elements, symbols, characters, images, terms, numbers, or the like. It should be kept in mind, however, that these and similar terms should be associated with appropriate physical quantities inside the computer and that these are merely convenient labels applied to these physical quantities that exist within the computer.

It should also be understood that manipulations within the computer are often referred to in terms such as adding, comparing, moving, etc. which are often associated with mental operations performed by a human operator. It must be understood that no involvement of a human operator is necessary or even desirable in the present invention, since the operations described herein are machine operations performed in conjunction with a human operator or user that interacts with the computer. The machines used for performing the operation of the present invention, as will be understood, include general purpose digital computers or other similar computing devices.

Furthermore, it should be kept in mind that there is a distinction between the methods, steps, or operations carried out by a computer, and the method of computation itself. The present invention does not involve a method of computation. The present invention rather relates to methods, steps, or operations for a computer and processing electrical or other physical signals to generate desired physical signals and display results and interactions. As illustrated in FIG. 1, the present invention also relates to apparatus 10 for performing these operations. This apparatus may be especially constructed for the described purposes, e.g., a touch-sensitive pen-based computer system, or it may comprise a general purpose computer that is activated or operated by computer programs stored in the computer.

Furthermore, it should be understood that the programs, algorithms, objects, etc. described herein are not related or limited to any particular computer or apparatus. Rather, various types of general purpose machines may be used with programs constructed in accordance with the teachings herein. Similarly, it may prove advantageous to construct specialized apparatus to perform the method steps described herein by way of dedicated computer systems with hard-wired logic or programs stored in nonvolatile memory such as read only memory.

OBJECT ORIENTED PROGRAMMING

Those skilled in the art will understand and appreciate that the best mode for implementing the present invention is via object-oriented programming languages and techniques. Object-oriented programming techniques are increasingly utilized by those skilled in the art of computer programming because they provide a powerful way to view the interaction of a user with a computer system. Since people interact with objects, it is logical to attempt to write computer program so that the "objects" with which a person interacts on a computer screen have counterparts "inside the computer", so to speak.

For example, one particular "object" that people often work with on computer screens is called a "window". A "window" is a rectangular area on a display screen that is used to display information or receive interactions. Indeed, the display screen itself is a window of sorts into the computer. A window receives user input from a keyboard, mouse, or pen, and displays graphical output on its surface. A computer program is responsible for generating the window, and responding to user interactions. A window often contains the computer program's title bar across the top of the window, menus, sizing borders, and perhaps other objects.

The surface of a window may contain additional, smaller windows called "child windows", which are subspecies or subclasses of windows. Child windows may take the form of push buttons, radio buttons, check boxes, text entry fields, list boxes, and scroll bars, and the like. These objects do not truly exist as physical objects, but when displayed on the computer screen may be pressed or clicked or scrolled like they have physical existence. A user sees a window as an object on the screen, and interacts directly with the object by pushing "a button", or scrolling a scroll bar, or tapping a handle.

A skilled object-oriented programmer's perspective is analogous to a user's perspective. A window generated by a computer program receives user input in the form of messages to the window. The messages are generated by an event handling routine that is responsive to user input such as tapping, clicking or dragging a cursor with a stylus or mouse.

The following is a brief example of an object-oriented programming methodology for resizing a window utilized in the Microsoft WINDOWS™ graphical user interface operating system. Consider a word processor application computer program that displays text in a window. The window may include a "size box", which is a control located at the lower right-hand corner of the window. If selected and dragged, the size box causes the size of the window on the display screen to change to larger or smaller. If the program's window is resized, the word processing program application program will reformat and move the text on the display screen to fit within the window when the window is resized.

The computer's operating system program generally handles the details of resizing the window, and the application program running under control of the operating system program responds to the system function of resizing the window. The word processing program "knows" when its window is resized because a message is passed to it indicating a resizing operation, and the application program responds by repositioning the text within the available window. In the WINDOWS™ operating system, when a user resizes a window, the operating system sends a message to the application program indicating the new window size. The program then adjusts the contents of its window to reflect the new size.

Stated in other words, the operating system program sends a "message" to the application program by calling a function (a procedure or a method) within the program. The parameters of this message describe the particular function to be executed by the computer.

The idea of passing a message to a program is tantamount to making a call to a function within the program. Such a function call can be made to the operating system, or to an application program. Those skilled in the art will understand that such mechanisms are how a program opens a disk file, for example, or scrolls text from an area that is "off screen" into view within the window. An operating system may make calls to a program by passing it messages, in a similar manner that the application program makes a call to the operating system.

Every window object that a program creates has an associated window procedure (also called a "method"). This window procedure or method is a function that could be either in the program itself or in a linked library of appropriate routines that can be executed upon a call. The WINDOWS™ operating system sends a message to a window by calling a window procedure. The window procedure does some processing based on the message passed to it, and then returns control to the operating system, possibly with a "notification" or other response. (A "notification" is merely a message passed back to a calling program, and usually indicates status information or the results of an operation.)

A window displayed on a display screen is based on what is known as a "window class" of objects. The window class of objects identifies a particular procedure that processes messages passed to that window. The use of a window class allows multiple windows to be based on the same window class, and thus use the same window procedure. For example, all control buttons in programs that utilize the WINDOWS™ operating system are based on the same window class. A window class is associated with a window procedures that processes messages to all button windows.

In object-oriented programming, an "object" is a combination of computer program code and data. A window is a type of object. The computer program code carries out tasks associated with the object. The data is the information retained by the window procedure and information retained by the WINDOWS™ operating system, for each window and window class that exists.

A window procedure processes messages to the window. Very often these messages inform a window of a user input from a keyboard, mouse, or pen. This is how a child window that is a button "knows" that it is being "pressed", or an icon "knows" that it is being dragged. Other messages tell a window when it is being resized or when the surface of a window needs to be repainted.

When a program begins execution in such an operating system as the WINDOWS™ operating system, the operating system creates a "message queue" for the program. This message queue stores messages to all the various windows a program may create. The program includes a portion of program code called the "message loop" to retrieve the messages from the queue and dispatch them to the appropriate window procedure. Other messages may be sent directly to a window procedure without being placed in the message queue.

Preferred Handheld Computer System

With the preceding background in mind, turn next to FIG. 1 for a discussion of the preferred embodiment of the handheld pen-based computer 10 constructed to carry out the methods of the present invention. The pen-based computer 10 comprises various components, which are illustrated graphically for purposes of illustration. First, a rectangular liquid crystal display (LCD) 18 occupies the front surface of a housing 19, and provides a surface upon which graphic images are displayed. Preferably, the LCD display 18 is touch or electromagnetically sensitive. A stylus 12 that is held by a user is used to write, draw, or gesture upon the surface of the display 18 to allow user interaction with the computer.

The computer 10 is preferably constructed around a central processing unit (CPU) 20, a memory 21, and an input/output (I/O) circuit 22, all of which are physically contained within the housing 19 but are shown externally in FIG. 1 for ease of understanding. It will be understood that the I/O circuit 22, CPU 20, and memory 21 are those typically found in most general purpose computers. Indeed, computer 10 is intended to be representative of a broad category of data processing devices. Thus, although there is no keyboard or other pointing device shown in FIG. 1, it will be understood that such types of computer systems are also suitable for use with the present invention.

The I/O circuit 22 is used to communicate information in appropriately structured form to and from other portions of the computer 10. For example, the I/O circuit 22 drives an optical port 25 which is employed to communicate information optically to similar optical devices. The I/O circuit further connects to a serial port 27, which allows electrical connection of peripheral devices such as communication lines to a desktop personal computer system, modem, or other device. The I/O circuit further connects to a PCMCIA slot 29 which allows usage of a PCMCIA memory card or other peripheral PCMCIA device such as shown at 31.

The display 18 is shown coupled to the I/O circuit 22 and is used to display images, data, etc. generated by the CPU 20 in accordance with the present invention. The display, as will be known to those skilled in the art, is a rectangular array of picture elements or "pixels", beginning at an origin (x=0, y=0), and extending across the width of the display screen to the rightmost extent (x=W), and downwardly to the lowermost extent (y=H) of the display screen.

In accordance with the invention, shown on the display screen 18 are two particular graphic display elements or items that in general characterize the present invention. Firstly, there is shown an action handle or icon 40 positioned adjacent to a text object 42. Preferably, both of these graphic display elements are objects in the object-oriented computer programming sense.

In accordance with the present invention, an action handle or icon 40 is displayed in proximity to (such as adjacent or atop) an associated data item or object such as the text 42; user interaction with the action handle 40, and therefore with the associated data object 42, is permitted in various ways described herein, without requiring gestures. Data items that utilize the present invention will always include an associated action handle in proximity on the display screen.

In the example shown in FIG. 1, exemplary text object 42 happens to be a string of text that is displayed in a rectangular region on the display screen 18 defined by the dotted box. (It will be understood that the dotted box is not displayed on the display screen of the computer, but merely signifies an exemplary data object—the text contained within the rectangular boundaries shown—for purposes of ease of understanding. Moreover, the invention contemplates various types of data objects, not merely text objects, e.g. a cursor object, a drawing object, an icon object, etc.)

The action handle 40 typically is relatively small compared to the data item, although size is not critical and no limitation as to size is intended. The size of the action handle 40 should preferably be such that a user can readily locate the action handle associated with any data object on the display screen. Indeed, the presence of an action handle indicates the presence of a selectable data item or object and the ability for the user to interact with the data object.

The exemplary action handle 40 shown in FIG. 1 comprises an activatable object, region, or "hot spot" on the display screen. This hot spot is bounded on the display screen by a predetermined region along the x-axis between x=HS1 and x=HS2, and along the y-axis between y=HS3 and y=HS4. If the user places the tip 13 stylus 12 within the hot spot region defined by these coordinates, the touch-sensitive circuitry of the display screen 18 will detect the presence of the stylus within the hot spot and generate an appropriate message. In a pen-based computer system, two particular actions of the stylus relative to the screen are contemplated—a tap and a drag. A tap occurs when a user quickly places the tip of the stylus within the hot spot and lifts it up, tapping the surface lightly on the display screen. A drag occurs when the user places the tip of the stylus into the hot spot, and rather than lifting the stylus, leaves the tip of the stylus in contact with the surface of the display screen and moves the stylus along a path on surface of the screen. In accordance with the present invention, the computer will generate appropriate graphical symbols on the display screen that will follow the tip of the stylus around on the display screen as if the user were "dragging" the action handle.

The foregoing actions of tapping and dragging allow the computer 10 to differentiate between actions that are intended by a user as an interaction with the data object or with the computer system, versus actions that are intended to constitute the entry of data such as handwriting or drawing on the display screen, both of which generate "digital ink" such as shown at 14. As has been previously described, "digital ink" 14 is an illuminated region of pixels on the display screen generated by the computer system in response to the movement of the stylus tip along the touch-sensitive surface of the screen.

Before turning to another subject, it will be understood that in accordance with the invention, an object such as the exemplary text object 42, and its associated action handle such as the action handle 40, are selectably repositionable on the screen. In other words, should the object be moved to another location on the screen, as by invocation of a command, a scroll of the window, a dragging operation, etc., the action handle maintains its relative position in accordance with the associated data object. No matter where a particular data object appears, if it has an action handle associated therewith, the action handle will be displayed in appropriated proximate juxtaposition. Those skilled in the art will understand that programming for the computer to implement the present invention will need to take into account the relocatability of a data object, and provide for corresponding relocation of the associated action handle.

Figure 2:
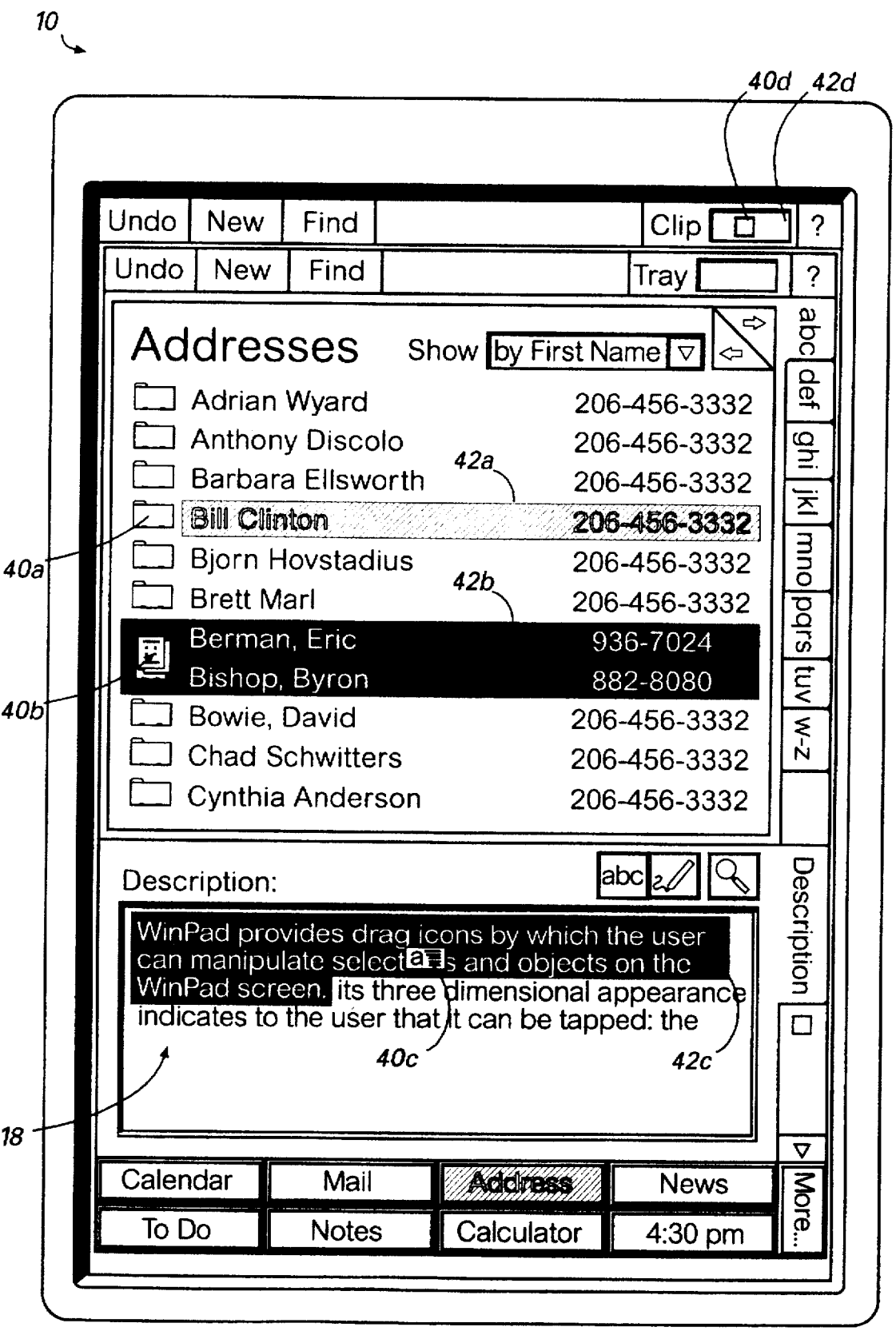
FIG. 2 illustrates an exemplary display screen for the computer of FIG. 1, that illustrates various relationships of action handles and associated data objects.

FIG. 2 illustrates various different relationships of action handles 40 with associated data objects 42, and the preferred relationship contemplated as the best mode by the present inventors. Several different embodiments of action handles and associated data objects are shown. The upper region of the display screen 18 includes a list of data items or objects, which in this case happens to be a list of names and telephone numbers in an Addresses window. An exemplary name in the list, "Bill Clinton", is shown highlighted as a selected data object 42a, with an associated action handle 40a. In this example, the action handle 40a is a small, "Rolodex" card-shaped icon positioned immediately to the left of the associated data item 42a.

In the central region of the display screen 18 in FIG. 2, there is shown a selected group 42b of two names, "Berman, Eric" and "Bishop, Byron". Both names are highlighted, indicating that the data items are selected. The associated action handle 40b comprises an icon bearing the resemblance of a stack of multiple sheets of paper. In the preferred embodiment, this particular icon indicates selection of multiple items. Thus, it will be understood that a data object can comprise plural data items considered as a group; an action handle such as 40b associated with such a group operates upon and with the group of data items.

In the lower portion of the display screen 18 in FIG. 2, there is shown a data object 42c comprising string of highlighted text, which in this case consists of the words "WinPad provides drag icons by which the user can manipulate selections and objects on the WinPad screen". The associated action handle 40c consists of a small rectangular box containing the lowercase letter "a" and is positioned atop the selected text.

In the upper right hand of FIG. 2, there is shown a data object 42d, which in this case comprises a "clip box" for carrying out clipboard operations such as copying. An associated action handle 40d consists of a small rectangular box positioned inside the clip box. As contemplated by the invention, if the user wishes to copy certain information to a different page or application, the user can use the clip box as a temporary holding area for the information. For example, the user can copy a name (such as the name "Bill Clinton") to the clip box by dragging an action handle 40a associated with the name to the clip box. The data (the name) will be copied into a memory buffer, and available for "pasting" into another program or into another object. The presence of an action handle such as 40d shown in the clip box indicates that a data item has previously been "copied" into the clip box. Preferably, the action handle can be dragged out of the clip box to perform a paste operation.

It will therefore be appreciated that the present invention contemplates provision of various types of action handles, in association with various different types of data objects. In the preferred embodiment of the present invention, action handles 40 are preferably positioned on the display 18 as follows:

For a single data object, such a single name 42a in the list, the action handle is preferably placed to the left of the object. (Note—preferably, this icon is allowed to scroll off screen if the associated object is scrolled off screen.)

For a group of objects, such as a selected series of addresses 42b in the address list, the action handle is placed to the left of the objects, but vertically centered through the vertical extent of the selected group of objects. (Note—preferably, this icon is allowed to scroll off screen only if all associated objects are scrolled off screen.)

For an insertion point, which is typically a flashing caret positioned somewhere in a string of text or on a drawing figure, the action handle is placed just beneath the baseline of the insertion point cursor or beneath the baseline of the text.

For a selected range of text on a single line, the action handle is preferably placed immediately above or below the text, wherever there is more visible room, centered horizontally with respect to the selected text, so as to avoid obscuring the text.

For a selected string of text that spans more than one line, such as shown at 42c in FIG. 2, the action handle is preferably placed in the center of a bounding box of the selected text. A bounding box is the smallest rectangle that would enclose the selected text.

With the exceptions noted above, if any of the foregoing rules for action handle placement cause the action handle to be off screen or outside the visible bounds of the window in which the object or text is displayed, the action handle is preferably moved vertically and/or horizontally until it is just inside a bounding rectangle of the window or screen on the display. If only one coordinate (x or y) exceeds the bounds of the window, then only that one coordinate needs to be adjusted.

The final rule is most likely to be utilized when the window constitutes a scrollable pane, which can occur if a data object is selected by the user, and the pane is scrolled so that the selected text and its associated action handle are scrolled off screen. Preferably, then, the action handle is displayed in the manner described even though the associated data object is not visible to the user. This is described in greater detail below.

Figure 3:
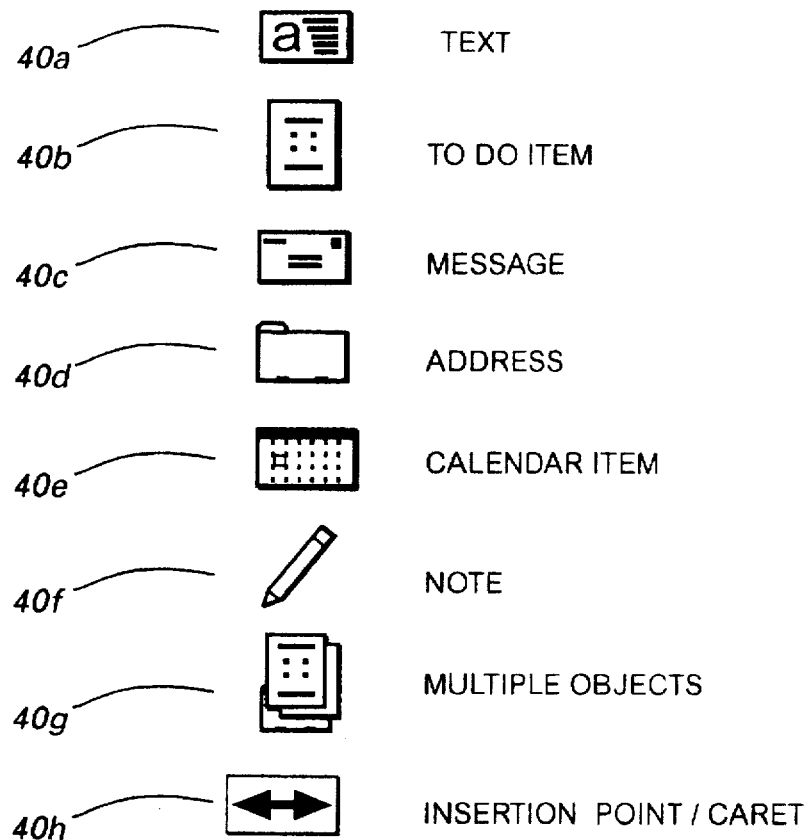
FIG. 3 illustrates exemplary static action handles utilized in the preferred embodiment of the invention to indicate different types of data objects or items.
Figure 4:
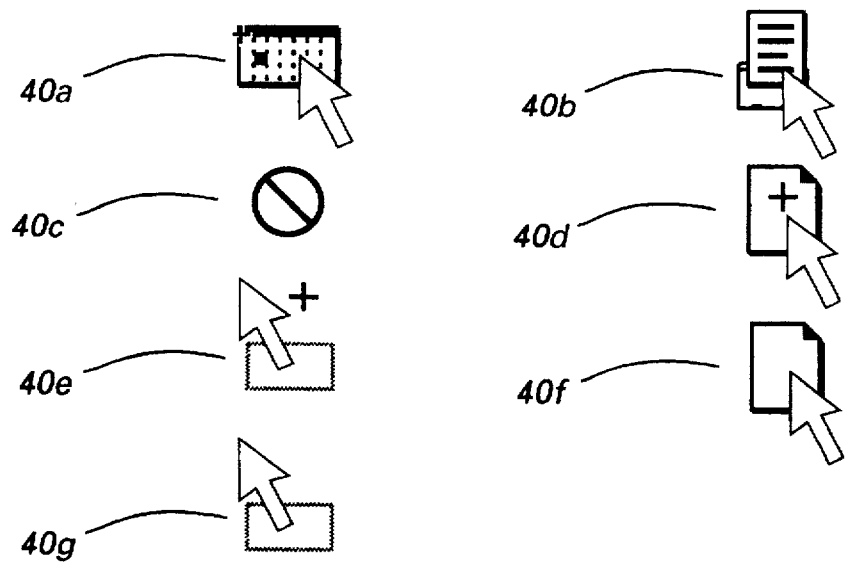
FIG. 4 illustrates exemplary dynamic (in dragging motion) and status indicating action handles or "drag icons" utilized in the preferred embodiment of the invention to indicate status of a drag or a drag-and-drop operation.

FIGS. 3 and 4 illustrate exemplary action handles 40 in preferred static and dynamic forms, respectively. In FIG. 3, there is shown a series of different exemplary action handles 40a through 40h whose icons indicate the nature of the associated data object, which are listed. Similarly, FIG. 4 illustrates the display of dynamic, status-indicating icons that are displayed as an action handle is dragged from one location to another on the display screen. Note that each different action handle has a different graphic symbol or icon associated therewith. The graphic nature of the icon indicates the nature of the associated item.

In FIG. 3, an action handle icon 40a comprising a lowercase letter "a" is utilized to indicate a text data item. The icon 40b is preferably a small list to indicate a to-do item. An envelope icon 40c indicates a message. A "rolodex card" icon 40d is used to indicate an address. A miniature calendar icon 40e is used to indicate a calendar item. A pencil icon 40f is used to indicate a note data item. A stacked sheets of paper icon 40g is used to indicate that multiple objects have been selected. An insertion point/caret icon 40h is preferably used in association with an insertion point (flashing bar) to indicate actions that can be taken with respect to text (e.g., dragging to select text, or tapping to invoke predetermined commands).

The action handles shown in FIG. 3 generally are displayed statically in the present invention in association with a data item of a corresponding type. The action handle remains displayed as long as the data object is visible on the screen in the form shown.

Action Handle Drag and Drop Operation

It will be recalled that one of the allowed actions is to drag an action handle, for purposes of moving the associated data item, or copying it, or invoking another action. As will be known to those skilled in the art, it is a customary practice in many computer graphical user interfaces for a program to generate and display a different icon from the static icon when an object is dragged with a pointing device such as stylus or mouse. The use of a different icon during motion generally provides certain predetermined status information about the action undertaken, for example that the item associated with the icon has been selected and capable of being moved, or that a time delay is occurring, or that a given action is not permitted. For purposes of the present invention, an icon displayed during an action such as dragging is called a "dynamic" or "status indicating" icon, and may also be called a "drag icon."

Drag icons are preferably utilized in the present invention during certain predetermined operations, namely, when an action handle is dragged or otherwise activated. FIG. 4 illustrates various dynamic action handles or drag icons 40a–40g employed in the preferred embodiment. A selected one of these drag icons is generated and displayed "underneath" the stylus point or other pointer as the stylus or pointer is (1) first used to point to and select an action handle by placing the stylus tip onto the hot spot of the action handle (or placing a pointer onto the hot spot and clicking to select the action handle, if a mouse or trackball is used), and (2) then moved about on the display screen to "drag" the action handle. Generally during a drag operation, the static action handle (as shown in FIG. 3) remains displayed in position with its associated data item, and the computer CPU 20 generates one of the exemplary drag icons as shown in FIG. 4 until the user "releases" the drag icon by withdrawing the stylus away from the display screen (or by clicking or other appropriate action if another type of pointing device is used).

The exemplary drag icons of FIG. 4 provide visual feedback to a user about the status of the current operation, such as a drag and drop operation. For example, a copy pointer drag icon 40a indicates that a copy operation has been invoked, that the selected data item has been copied, and that a copy of the selected item is being moved. A multiple objects pointer drag icon 40b indicates that a selected group of objects is being moved from one location to another.

The user can also determine that the data item can not be dropped at the current pointer location (e.g. when the user attempts to drop the selected data item on or in an incompatible or impermissible location) when the drag icon appears as a circle with a slash through it, as shown at 40c.

Other types of move and copy type drag icons are shown at 40d–40g. In the preferred embodiment, a user can determine whether a copying operation or moving operation has been activated by the presence or absence of a plus sign (+) associated with the drag icon. For example, the "copy" type drag icons 40d, 40e include a plus sign (+), while similar but "move" type drag icons 40f, 40g lack the plus (+) sign.

Preferably, the selection of a copy type icon or a move type icon is determined at the time an object is dropped, and depends upon the drop target. For example, if a drag icon is moved onto a storage directory or subdirectory, the plus sign (+) may be generated to indicate that a drop of the icon would result in the item being copied into that directory or subdirectory.

Figure 5:
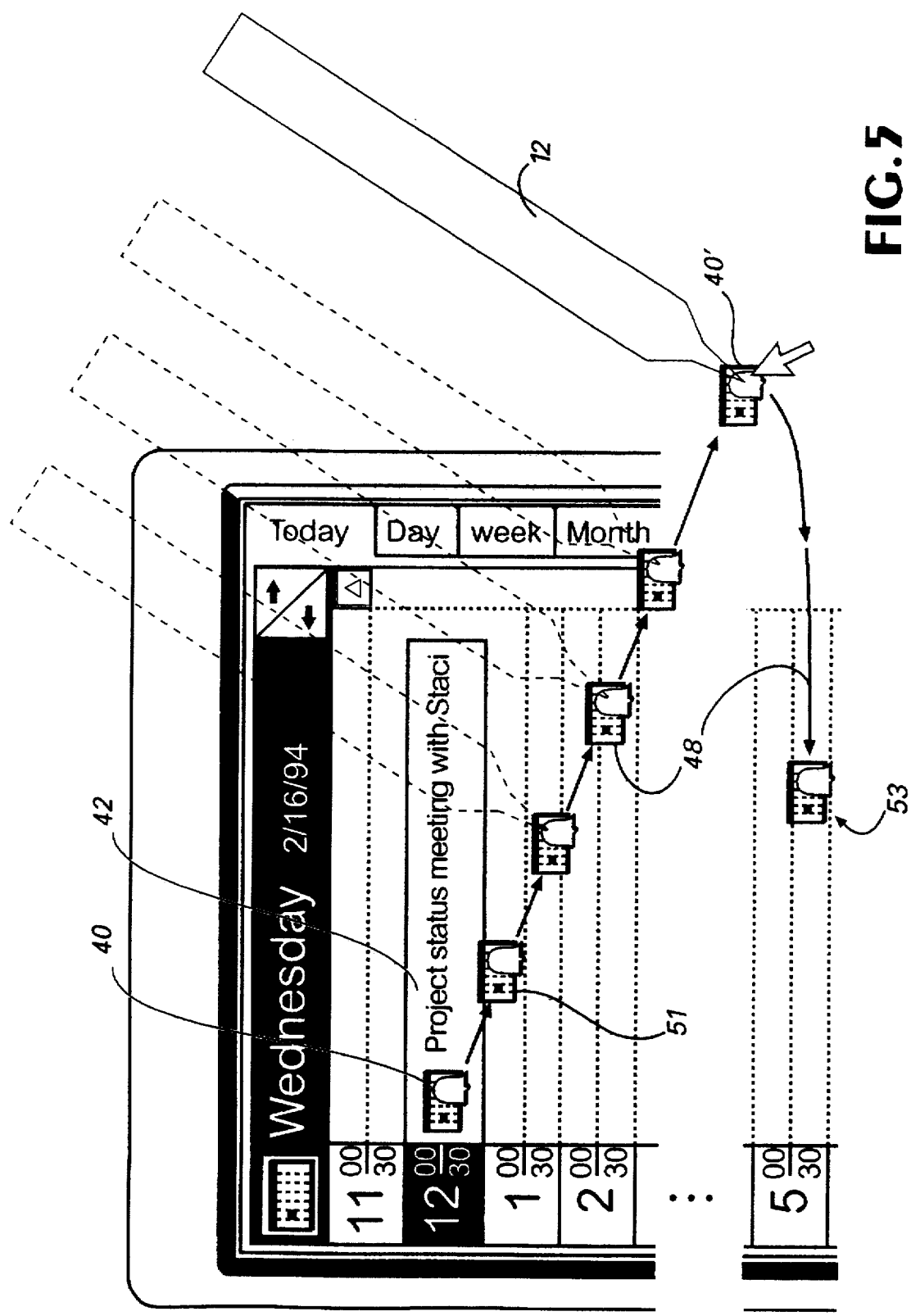
FIG. 5 illustrates a general drag-and-drop operation utilizing an action handle.

Refer now to FIG. 5 for a discussion of the manner in which a user of a pen-based computer interacts with an action handle for a dragging operation, and how the static action handles and drag icons are generated. In the figure, the action handle 40 is being dragged with a stylus 12, from its initial position to a rest position at 53. In this example, the data object is a calendar item 42 indicating "12:00—Project status meeting with Staci", and has a corresponding (static) action handle comprising a miniature calendar. The static action handle 40 remains in position during the operation, displayed in proximity to the data object. As the stylus 12 is moved to drag the action handle, a drag icon 40' is generated at successive positions along the trajectory 48 of the stylus, beginning immediately after the tip of the stylus leaves the area of the static drag icon at 51 until the resting position at 53, which is at the calendar time 5:00 PM. At the resting position 53, assume that a location where the selected data item may properly be deposited or "dropped", e.g. at the time 5:00 PM, which occurs upon release or withdrawal of the stylus (or clicking or tapping, if desired). If the end result of the operation is a proper move operation, upon release the static action handle 40 and its associated data item 42 appear at the new location, and are deleted from the old, initial location.

It will now be appreciated that, in the preferred embodiment, a user can use action handles to copy or move information anywhere within a supported series of applications operating within the computer system. The approach utilized in the present invention is considered a "drag-and-drop" approach, which is generally known to those skilled in the art. The drag-and-drop approach to data movement and manipulation is very useful when a user needs to change or duplicate information quickly. In the calendar example of FIG. 5, if a user wishes to change a meeting to a different time of day, he or she can reschedule it by dragging the action handle 40 associated with an appointment time within a calendar to a new time, or a new date. During the drag operation, an appropriate drag icon is generated and displayed.

Those skilled in the art will understand that a drag-and-drop operation depends upon the particular application and context. For example, in a calendar application program, information that is dragged within a page is considered moved, whereas in a different application, such as a "to-do" list, the information is copied rather than moved. Preferably, therefore, the system is programmed to presume that a move is intended if the drag-and-drop operation occurs within a given application, but that a copy operation is intended if the data item is posted to a clip box to be copied, or moved to a different application program to which the data can properly be copied.

Figure 6:
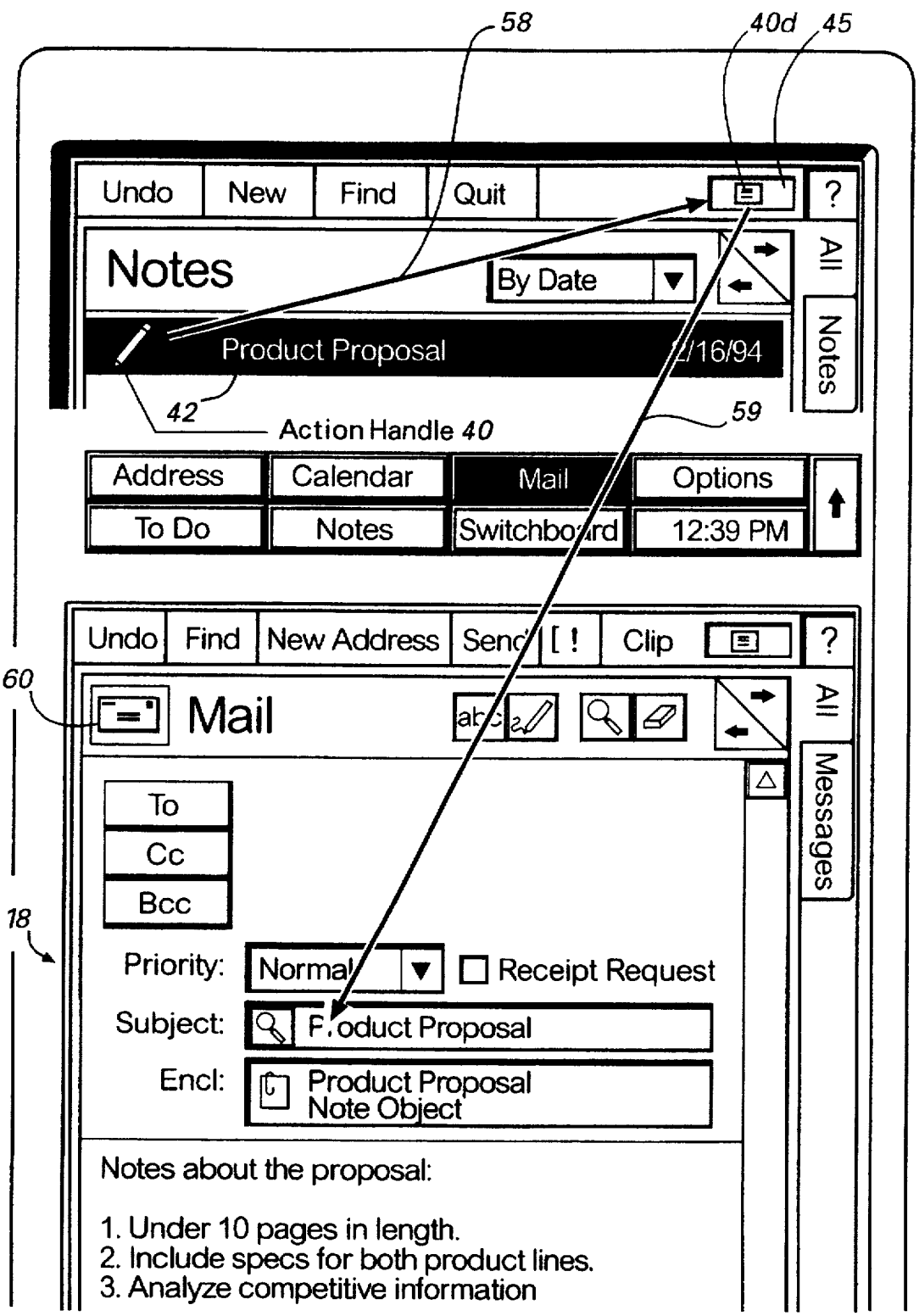
FIG. 6 illustrates a drag-and-drop operation to a clip box, for copying a data object associated with an action handle.

Refer now to FIG. 6 for a discussion of the use of action handles to move a data item from one application to another. As previously described, the present invention supports a copying operation using the action handle. The clip box 45 provides a region within the display 18 for providing a "clipboard" operation. If the user wishes to copy the information associated with an action handle to a different page or application, the user can use the clip box as a temporary holding area for the information.

For example, assume in FIG. 6 that the user wishes copy a data item comprising a note 42 "Product Proposal" from a Notes application to a Mail application. The user first drags the action handle 40 associated with the data item along the path 58 to the clip box 45, activates the Mail application, and then drags from the clip box into the Mail application. A clip box action handle 40d appears in the clip box 45 after this first drag operation to indicate that data has been copied into the clip box. The movement into the Mail application is accomplished by dragging the action handle 40d out of the clip box along a path 59 to a new location.

In the preferred embodiment, the clip box 45 only holds one item of information at a time. If a second item is copied to the clip box by dragging and dropping, then the existing information is deleted. However, information can be copied from the clip box multiple times, as the information is not deleted until another item is copied on top of it.

Thus, to copy or move information between pages or applications, the user:

Drags the action handle of the associated data object to the clip box 45.

If it is desired to copy or move information to another application, then switch to the other application by using the stylus, pointing device or other command to activate the application.

Activates other controls in the computer system to display the dialog, or page, where the information is to appear.

Drag the action handle from the clip box 45 to its new location.

If the user is moving information, the user may switch back to the originating or first application and delete the original information.

Action Handle Tapping or Other Selection

As previously described, a particular action contemplated in the present invention is that of tapping an action handle with a stylus. The preceding diagrams have illustrated operations involving dragging an action handle. In the preferred embodiment of the present invention, tapping an action handle causes display of a "pop-up" menu, also called a "context" menu, that display various types of actions that may be selected with respect to the particular data object associated with the action handle. Those skilled in the art will understand that in computer systems that utilize pointing devices such as a mouse or trackball, the same considerations will apply, except that the operation is that of pointing and clicking as opposed to tapping.

Figure 7A:
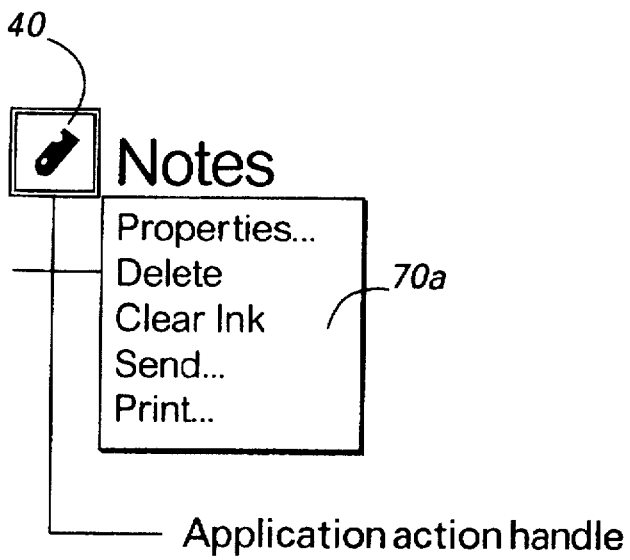
FIGS. 7A and 7B illustrates pop-up or context menus that are generated in the preferred embodiment of the present invention when a user taps on an action handle associated with a predetermined application and a predetermined data item, respectively.

FIG. 7 illustrates two exemplary types of pop up menus contemplated in for use in the present invention. FIG. 7A illustrates an application-oriented pop-up or context menu 70a that appears when application action handle (e.g. a Notes action handle 40) is tapped. For purposes of the present discussion, an "application" action handle is an action handle that is positioned in proximity to a data item corresponding to an application computer program, such as a word processor, a note taking utility, a calendar program, an address list manager, etc. In accordance with the invention, the application pop-up menu 70a includes, in a predetermined hierarchy, a series of selectable actions that may be activated by the user. In FIG. 7A, the selectable actions include Properties . . . , Delete, Clear Ink, Send . . . , and Print . . . Preferably, the pop-up menu appears on the display screen in response to a tap of the action handle, overlaid upon other information, and remains until (a) the user taps somewhere on the screen outside the menu or presses the escape key, or (b) one of the selectable activities has been activated by a tap upon the appropriate desired action. For example, to initiate a printing operation, the user would tap the Print . . . region, which would be highlighted, flashed, and a printing operation would commence.

Figure 7B:
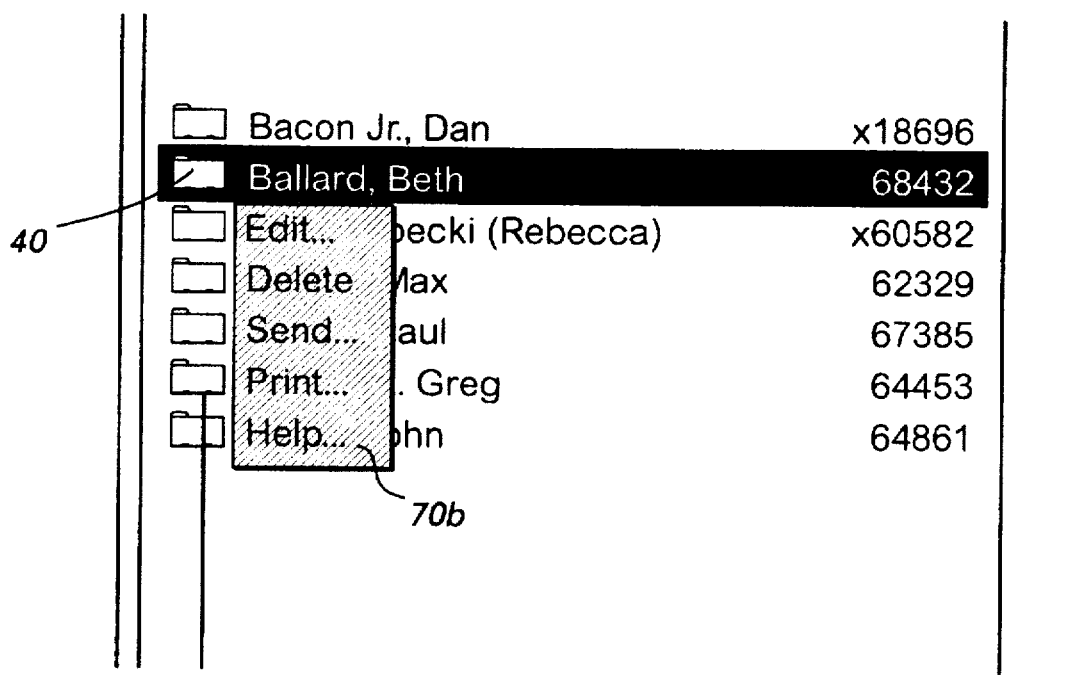

Other types of pop-up menus are contemplated. In FIG. 7B, a data item pop-up menu 70b is illustrated. A data item pop-up menu is displayed when an action handle associated with a data item is tapped. In the example shown, there is a list of names, including the name "Benson" shown in highlighting (the other names are obscured by the pop-up menu 70b, although their action handles are visible). The data item pop-up menu also contains, in a predetermined hierarchy, a series of selectable actions that may be activated by the user.

The pop-up menu 70b displays various actions that are available for this particular data object. For example, in FIG. 7B, the operations of Edit . . . , Delete, Send . . . , Print . .

. , and Help . . . are available. As in the application-oriented action handle, the user may activate the appropriate action by tapping the desired command within the pop-up menu.

The preferred action handle pop-up or context menus provide a user with a consistent mechanism to interact with objects in computers that employ the teachings of the present invention. In order to maintain consistency between application, and preferred embodiment, the rules set forth in Table I are employed. A context menu is preferably divided into five logical sections. However, not all applications or objects will necessarily implement all sections:

TABLE I

| | |
|---|---|
| First Item | The preferred first item in a context menu is a default action that occurs when the user double taps on the action handle. Thus, the user can avoid the delay associated with popping up the menu and then selecting the first item by merely double tapping the action handle or the object (or double clicking with other pointing devices). |
| Application Specific | The second group of commands is where application-specific information is placed. For example, in an e-mail application called Mail, this could include the commands Reply, Reply All, etc. |
| System | This is where all system specific functions are placed. Examples of these include Send . . . , Print . . . , Save . . . , etc. |
| Delete | This section contains the delete commands for the object and for ink. The delete commands include Delete Ink, Delete. |
| Properties | This section contains the Properties . . . selection which allows a user to select properties, attributes, or preferences. |

The following Table II is an example of selected exemplary commands in a preferred order as employed in the present invention. Those skilled in the art will understand that each individual application program can utilize only the required menu selection items. Preferably, note also that the different sections are preferably separated by heavy border so as to allow readily distinguishable regions for the user to select.

TABLE II

| | |
|---|---|
| First items | Edit . . . <br> View |
| Application Specific | Undo <br> Cut, Copy, Paste <br> Reply, Reply All, Forward |
| System | Send . . . <br> Print . . . <br> Save . . . |
| Delete | Clear Ink <br> Delete |
| Properties | Properties . . . |

Action Handle for Variable Data Such as Text

Figure 8A:
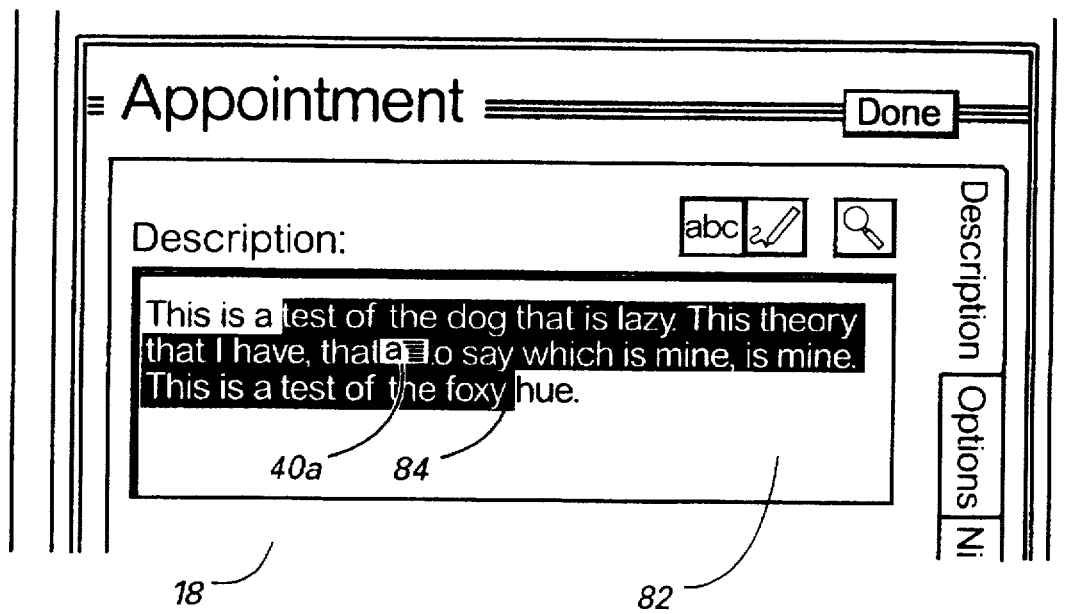
FIGS. 8A–8C illustrates a drag-and-drop operation applied to an action handle associated with a range of selected text in an exemplary text-based application program, in accordance with the invention.
Figure 8B:
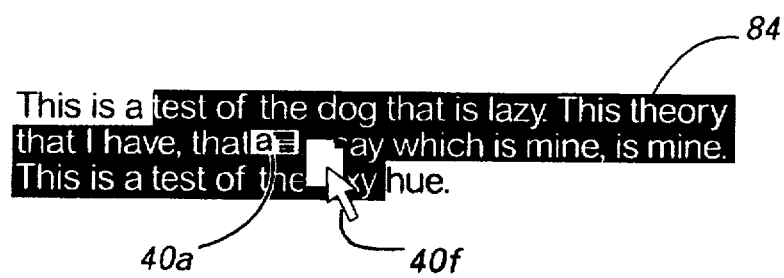
Figure 8C:
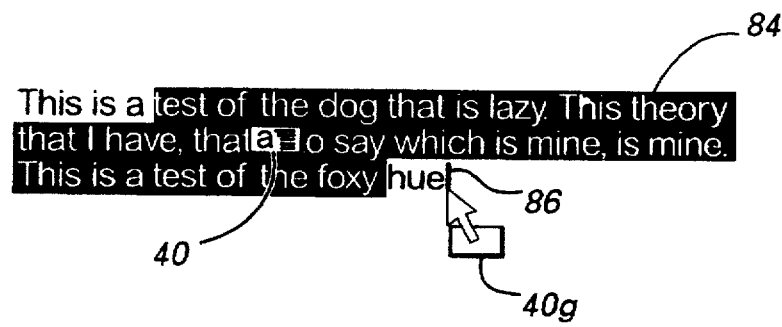

FIG. 8, consisting of FIGS. 8A–8C, illustrates a sequence of operations and associated graphic displays that are generated in the preferred embodiment from an interaction with an action handle associated with a range 84 of selected text in an exemplary text-based application program. In the example shown in FIG. 8, the display 18 includes a window 82 in which is displayed a string of (admittedly nonsensical) text: "This is a test of the dog that is lazy. This theory that I have, that I say which is mine, is mine. This is a test of the foxy hue."

Of the entire text string shown, only this text is selected: "test of the dog that is lazy. This theory that I have, that I say which is mine, is mine. This a test of the foxy", as shown in reverse video (white on black). This is an example of a range 84 of text that has been selected by an operation described in conjunction with FIG. 11. The reader is referred to FIG. 11 for a discussion of the manner in which text is selected utilizing a stylus or other input device.

The range of text 84, which is a data item, has associated therewith an action handle 40a, in accordance with the invention.

In the example of FIG. 8, assume that the selected range of text 84 is to be moved by a drag-and-drop operation to another location, such as after the word "hue". The present invention supports dragging the action handle 40a, converting the action handle to a cursor to indicate an insertion point, and release of the action handle at a desired location, resulting in movement of the text to a new location.

In FIG. 8A, the range of text 84 is selected, and the appropriate type of static action handle 40 is displayed, in this case a text-type static action handle 40a from FIG. 3, centered within a bounding box of the text as set forth in earlier-described rules.

In FIG. 8B, the stylus is placed into the hot spot region of the action handle 40a and dragged a short distance away from the original static action handle, but still within the highlighted region of selected text. Here, the computer causes generation of a dynamic action handle or drag icon 40f, such as the drag icon 40f from FIG. 4, indicating that a move operation is being effected. Note that the particular action handle 40f shown in FIG. 8B corresponds to a movement-type (but not copied-type) action handle. As previously described, the drag icon provides visual feedback to the user that a dragging operation is underway.

In FIG. 8C, once the x-y coordinates of the stylus tip or pointing device passing outside of the selected range of text 84, two things occur—(1) a flashing cursor or insertion point 86 is displayed underneath the stylus tip to indicate that the data item (the selected text) associated with the action handle may be "dropped" at the position indicated by the cursor 86, and (2) a different type of drag icon 40g is displayed. The user indicates that he or she wishes to drop the selection at the desired point by lifting the stylus from the surface of the display screen 18 (or by clicking, if appropriate).

Note the difference between the drag icon 40f and 40g. The drag icon 40f has the tip of the arrow inside a small rectangular icon with a dog-eared corner, to indicate that something is being dragged. On the other hand, the drag icon 40g has the base of the arrow inside the rectangular, dog-eared icon, and the tip of the arrow terminating on the insertion point 86, to indicate that the item will be put into the location pointed at by the arrow.

Those skilled in the art will understand and appreciate that the use of varying types of action handles in the present invention-static and drag icon-substantially reduces ambiguity in a GUI employing the teachings of the invention. More specifically, the second cursor type makes it easier for a user to see exactly where moved or copied text will be placed. As described in the background, there can be ambiguity in a pen-based system as to whether a move operation or a copy operation is intended. In some contexts, determination whether a move operation or copy operation is intended depends upon the destination at release of the dragged action handle. For example, a dragging operation of an action handle into something like a trash can may implicitly be interpreted as a "delete object" operation. On the other hand, a drag onto a fax machine icon or the clip box 45 shown in FIG. 1 is a copy operation.

It will now be understood that there are at least two types of drag icons utilized depending upon the destination type. If a dropping operation into a text area such as shown in FIG. 8 is intended, a standard cursor such as shown at 40f is utilized. This type of cursor keeps the hot-point (the tip of the arrow) so that the user can see the insertion point or cursor. In other cases, however, it may be desirable to show the actual action handle or a replica thereof being moved at the hot spot of a drag cursor. Preferably, a drag operation cursor will include an arrow so as to provide visual feedback to the user that a dragging operation is being carried out.

In FIG. 8B, as the user drags the action handle, the cursor changes and transforms into a drag icon 40g with arrow comprising a large easy-to-see caret following the cursor 86, indicating where the text will go. While the hot-spot (the tip of the arrow) is still over the selected text or source 84, the drag icon shown at 40f is preferred.

As shown in FIG. 8C, if the user moves to another portion of the document, the hot spot (tip of the arrow) culminates on the flashing insertion bar.

Figures 9, 10:
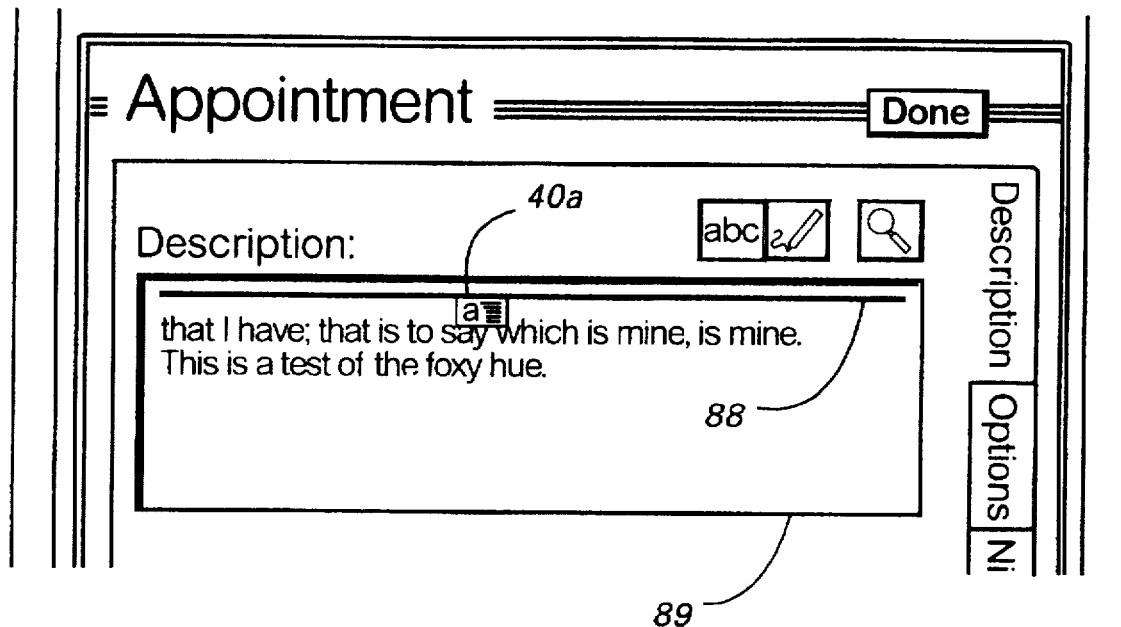
FIG. 9 illustrates an action handle that is "pinned" to a border of a window in accordance with the invention, indicating that the associated data object has been scrolled off-screen.
FIG. 10 illustrates an action handle associated with a small range of selected text of a size approximating that of the action handle itself, displayed beneath the selected text, in accordance with the invention.

Referring now to FIG. 9, if the user scrolls to another portion of the document, as by using a scrollbar (not shown in the figure), the action handle remains visible, "pinned" to the edge of the screen or document closest to the actual position of the selection. In FIG. 9, the action handle 40 is pinned to the top border 88 of a window to indicate that the selected data item is off screen. If the user stops dragging, preferably, the action handle transforms from a drag icon such as 40f or 40g to a static action handle such as 40a (shown in FIG. 9).

The user can preferably pick up the action handle and resume the drag at any time. Preferably, if the drag is resumed with the action handle "pressed" to a window border such as 88 (or a bottom border such as 89) the text will autoscroll, that is, the text in the window scrolls upwardly or downwardly when the action handle is moved to a border of a display window, as a function of velocity of the stylus or other pointing device.

When the action handle is released by removal of the stylus from the screen, the selection appears in a new location indicated by the cursor and remains selected or highlighted.

It will understood that the scenario just described is one where the selected text is moved to another location on the screen. It should be remembered that the action handle could also have been dropped onto an application button, the clip box 45, or other icon. If such other icons are responsive to the action indicated, appropriate action will be indicated and activated.

Turning now to FIG. 10, if the selected range of text 84 is not big enough to contain the action handle 40, preferably it is drawn adjacent to the selection. Note that the action handle 40 in FIG. 10 does not obscure the selected text 84, which consists of a single word "dog" in this example. Preferably, the action handle is displayed beneath the text, in accordance with the rules described earlier herein, so that the user is not prevented from drawing gestures upon the selection or upon other text if desired (or above the selection, if there is inadequate room below).

Selection of Text With Action Handle and Cursor

Turning next to FIG. 11, the present invention also contemplates association of an action handle with a data object such as a cursor that can be conveniently used for operations such as selecting text in a word processing type application, or selecting graphic objects such as a handwriting or a picture. The problem addressed by this aspect of the invention relates to distinguishing digital ink from commands to the computer such as selecting text. With a pointing device such as a mouse or trackball, it is known that a user can select text by simply (1) pressing a button at the beginning of the text to indicate the beginning of a selection, which usually causes display of a flashing cursor or insertion point, (2) dragging the cursor across the text, and (3) releasing the button to indicate the end of the selection. However, this press/drag/release action is ambiguous with a stylus pointing device, where it cannot be distinguished from handwriting. Therefore, this type of operation is not preferred for use with a pen, because the action of dragging with the pen is preferably reserved for drawing digital ink to make letters and/or gestures.

In the present invention, this problem is solved by associating an action handle with an insertion point in text. This allows creation of a draggable, stretchable selection. For purposes of this discussion, an "insertion point" is the place where characters typed from a keyboard are placed, typically denoted by a blinking caret or vertical bar. An insertion point can also be thought of as a selection containing zero characters.

Optionally, the present invention contemplates generation and display of the action handle only upon an initial action such as a tap by the user at a particular location in the text. This particular option requires an additional step—the initial tap to create the insertion point and associated action handle. Preferably, however, an action handle is displayed in association with a flashing insertion point continuously, so that the user will readily be able to find the insertion point (because of the size of the action handle) and will not have to remember the tap required to cause creation of the action handle.

Figure 11A:
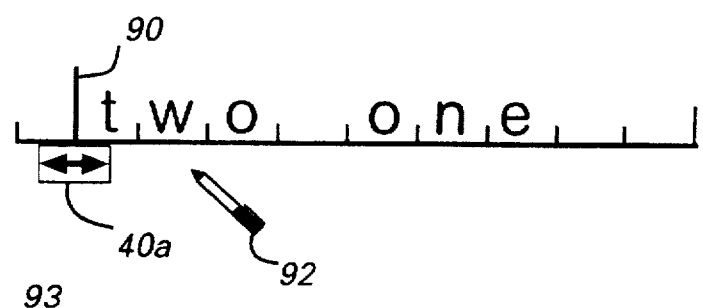
FIGS. 11A–11G illustrates an action handle in association with a flashing cursor data object, for purposes of text selection and manipulation, in accordance with the invention.

In FIG. 11A, therefore, there is shown an action handle 40a displayed in association with a caret 90, which is merely another type of a data object. In FIG. 11A, no selection is indicated. The action handle 40a may be considered a "selection drag button" that is centered beneath the blinking insertion point or cursor 90.

Note also the presence of a pen icon 92, which represents an independently displayed icon in systems that are not pen-based, or can represent the action of a stylus brought into contact with region on the display screen defining the action handle 40a.

Figure 11B:
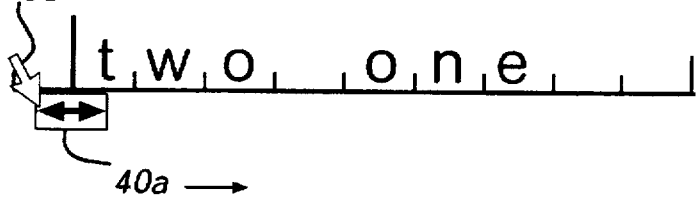

In FIG. 11B, assume that the pen (or other pointing cursor) 92 is positioned over the action handle 40a and in contact with the display screen. Preferably, the pen cursor changes to an arrow 93 (in this case a "southeast" arrow.) Preferably, a southeast arrow cursor is employed rather than the northwest cursor that is often used in mouse-based systems, because a northwest cursor is too easily obscured by the pen in a user's hand.

Figure 11C:
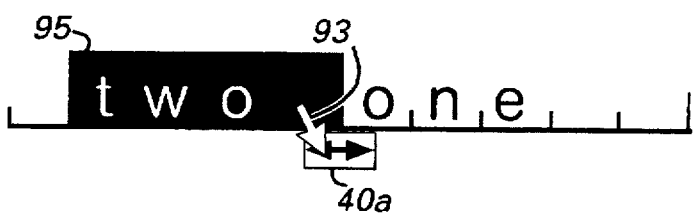

In FIG. 11C, the pen is pressed down and the user begins to drag the action handle 40a to the right, towards the words of text "two one". In one embodiment, the action handle can disappear and the southeast arrow cursor 93 remain, as shown. Each time the insertion point crosses the midpoint of a cell in which a text letter is centered, the selection highlight adjusts accordingly to indicate selection. In the preferred embodiment, this is indicated by display of the characters in reverse video (white on black). In other words, selection proceeds similar to that employed with the press-and-hold employed with common mouse user interfaces. Note that touching the stylus outside of the action handle 40a would have initiated handwriting entry.

Figure 11D:
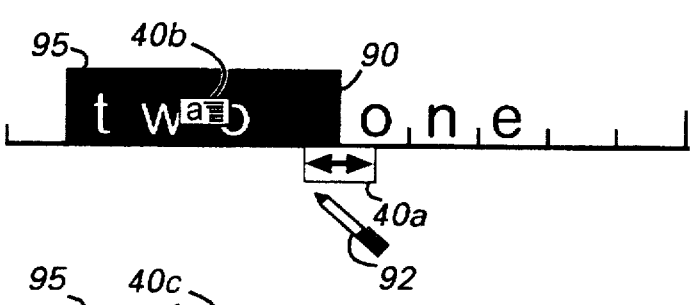

In FIG. 11D, when the desired selection has been established, in this example selection of the word "two" 95, the user lifts the pen (or clicks with the mouse). Preferably, then, the cursor changes back to the pen 92, and a static action handle 40b appears centered inside the selection 95. Optionally, the insertion point action handle 40a may be retained at the end of the selection, underneath the insertion point 90.

It will be recalled from earlier discussion that if the selection takes up more than one line, the text action handle 40b should preferably be centered in the selection. Alternatively, if a selection begins near the end of one line and ends shortly after the beginning of another line, so that the selection highlighting on the two lines do not overlap, then the action handle may be centered in whichever part of the selection that is longest. Similarly, if the selection is so large that part of it is not visible in the displayed window, the action handle is preferably centered inside the visible portion of the selection.

It will also be recalled that if the user scrolls a selection by dragging an action handle to a window border, the action handle scrolls with the selection until the action handle reaches the edge of the window. If the user continues to scroll the selection out of sight, the action handle "sticks" or is pinned at the edge of the window. This feature allows the user to scroll to a distant drag/drop destination and then drag the still-visible action handle to carry out the drag/drop operation.

Figure 11E:
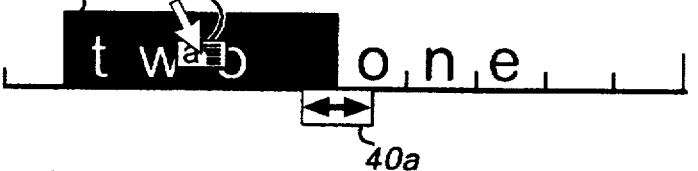

As shown in FIG. 11E, in order to move the text the pen (or cursor) is positioned over the text action handle 40b and the cursor changes to the appropriate dynamic drag icon, e.g. 40c.

Figure 11F:
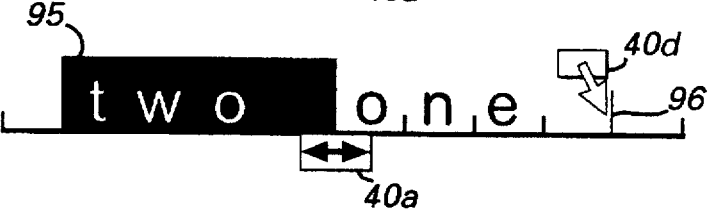

As shown in FIG. 11F, the user presses the pen down on the action handle 40c and begins to drag to a new location, as at 40d. If desired, the static action handle can disappear, but preferably is retained, while suitable drag icon tracks the movement of the stylus. Optionally, a thin gray line or insertion cursor may be employed to track the drag icon, as shown in FIG. 11F at 96. Preferably, if the user lifts up the pen while the gray line is still within the highlighted selection region, the text is not moved.

Figure 11G:
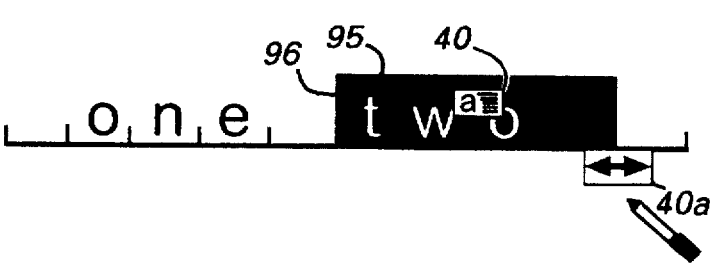

As shown in FIG. 11G, when the desired drop location has been reached, the user lifts the pen up and the selected text 95 (selected data object) appears at the new location. The text is thereby moved to the new location, formerly represented by the position of the flashing insertion point 96. Preferably, the text remains selected, with the static icon 40 or action handle centered inside. The user can then easily move the selection again if necessary or can invoke the context menu by tapping on the action handle to act upon the selection with appropriate commands, as described.

Those skilled in the art will now understand the operation of the present invention to implement action handles in conjunction with associated data objects.

Object Oriented Programming of Action Handles

Those skilled in the art will understand that object-oriented programming languages such as C++ are preferred for preparing computer programs in accordance with the present invention, since such programming approaches facilitate the paradigm of objects consisting of action handles and associated data items. Before discussing specific objects, messages, procedures, and notifications employed in the construction of the preferred embodiment of the present invention, we will first provide a brief overview of object-oriented programming, so that the reader will understand that those skilled in the art will be enabled to make and use the present invention with the descriptions provided herein.

The basic difference between procedural and object-oriented programming is in the way that the data and action upon the data is treated. In procedural programming, data and action are two separate things. A programmer defines data structures, and then routines are written to operate on the data structures. For each data structure that is employed, a separate set of routines is required.

In object-oriented programming, actions and data are more closely related. When a programmer defines the data—which constitutes objects—he or she also defines the actions that can be taken upon such data. Instead of writing a set of routines that do something to a separate set of data, the programmer creates a set of objects that interact with each other by passing messages back and forth.

In "object" is an entity that contains some data and an associated set of actions that operate on the data. The data can be extracted from the object and sent to another object, for example when the data is to be stored in a file. To make an object perform one of its actions, the object is sent a message. For example, in the present invention the programmer will create an object that represents the action handle, and similarly will create objects that represent data items such as an address, a selected range of text, a insertion point, or the like. The data associated with the object such as the action handle will contain locations of the boundaries of the icons and the definition of the hot spots, a bit map of the graphic appearance of the action handles, the present coordinates of the action handles, etc., as well as indication that various actions can be taken upon appropriate activation. For example, to cause an action handle to pop up a context menu, an action handle object is sent a "tap" message.

For the time being, the manner in which objects are sent messages is beyond the scope of the present discussion. Such operations are typically within the purview of the operating system or of the compiler that is employed to generate program code.

Contrast the foregoing with the manner in which an action handle is programmed with procedural programming. First, the programmer must define a data record that represents the boundaries of the icon relative to the display screen, and must translate these local boundaries to the global coordinate system associated with the display screen. The programmer will then have to write different routines for the different actions that could be performed when a user interacts with the action handle, namely, one to cause a pop-up menu to be generated upon a tap, one to cause generation of an "inside selection" drag icon as the action handle is dragged within the range of selected text, and a different routine to cause display of an "out of selection" drag icon as the action handle is dragged outside of the selected text. These routines would have to be rewritten for each different type of action handle and the associated actions that could be carried out with respect to that particular type of action handle.

A particular advantage of object-oriented programming over procedural programming is that a programmer can keep the routines that operate on a data structure together with the data structure that they are operating on. This is called "encapsulation".

A more significant advantage in object-oriented programming is that objects can inherit data and behavior from other, similar objects. Every object belongs to a "class", which defines the implementation of a particular kind of object. A class describes the object's data and the messages to which it responds.

Classes are somewhat related to record declarations in conventional programming languages. A class may be thought of as a template for creating objects. The class describes an object's data and the messages to which it responds. A particular object is called an instance of a class. The programmer defines data for the class the same way that fields of a record are defined. With classes and objects, though, fields are called "instance variables". Each instance of a class, that is each object, has its own instance variables, just as each variable of a record type has the same fields.

When a message is sent to an object, the object invokes a routine that implements that message. These routines are called "methods". A class definition includes method implementations. Method implementations are sequences of computer program steps that are carried out in response to a particular message.

It is important to keep in mind that a message and a method are not the same thing. A message is sent to an object. However, an object responds to a message by carrying out a method.

Turn next to FIG. 12 for an illustration of these object-oriented concepts. This figure illustrates an exemplary class definition 100 for an object type, "Rectangle". Assume for purposes of this discussion that a Rectangle object is a computer program that is operative to draw a rectangle on the display screen in response to being sent a "Draw" message. For this exemplary Rectangle class, there are instance variables consisting of the Upperleft Corner, Upperright Corner, Lowerleft Corner, and Lowerright Corner. There might also be an instance variable indicative of the thickness of the line to be drawn between the corners to define the rectangle, Linewidth. There might also be an instance variable, Fillpattern, indicative of a fill pattern to be filled or drawn inside the boundaries of a rectangle.

Three exemplary messages are shown for the rectangle class: Draw, Erase, and Move. The Draw message causes invocation of a method for drawing a line from point to point, where the points are represented by the instance variables Upperleft Corner, Upperright Corner, Lowerleft Corner, and Lowerright Corner. Similarly, an Erase message causes the lines to be erased. Finally, a Move message causes the corner points to be translated or offset to another location. After a Move operation, a new Draw message might be sent, so that the rectangle appears on the screen to have moved from one position on the display to another.

The concept of "notifications" in object oriented programming should also be kept in mind. Like programming of subroutines, the programming of objects will often result in the generation of return results or messages that must be delivered back to an object that initiated an operation by sending a message. These return results or messages may also be called notifications. For example, a calculating object that is sent an "Add" message with instance variables "2" and "3" might return a notification of "5", which is the result of the addition operation 2+3. Similarly, a drawing object (Rectangle) that is sent a Draw message together with coordinates that are outside the range of the display screen might return a notification (e.g. an error notification) that the operation cannot be completed as requested. Specific notification messages utilized in the present invention are discussed in greater detail below.

Inheritance and Polymorphism

Programmers utilizing an object-oriented programming environment can define a class in terms of an existing or higher up class. The existing class is called a superclass, and a new class may be called a subclass. A class without a superclass is said to be a root class. A subclass inherits all the instance variables and methods of an associated superclass. Subclasses can define additional instance variables and methods. Subclasses can also override methods defined by the superclass, so as to provide different operations in different contexts.

Overriding a method means that the subclass responds to the same message as its associated superclass, but that the subclass object uses its own methods to respond to the message.

Figure 13:
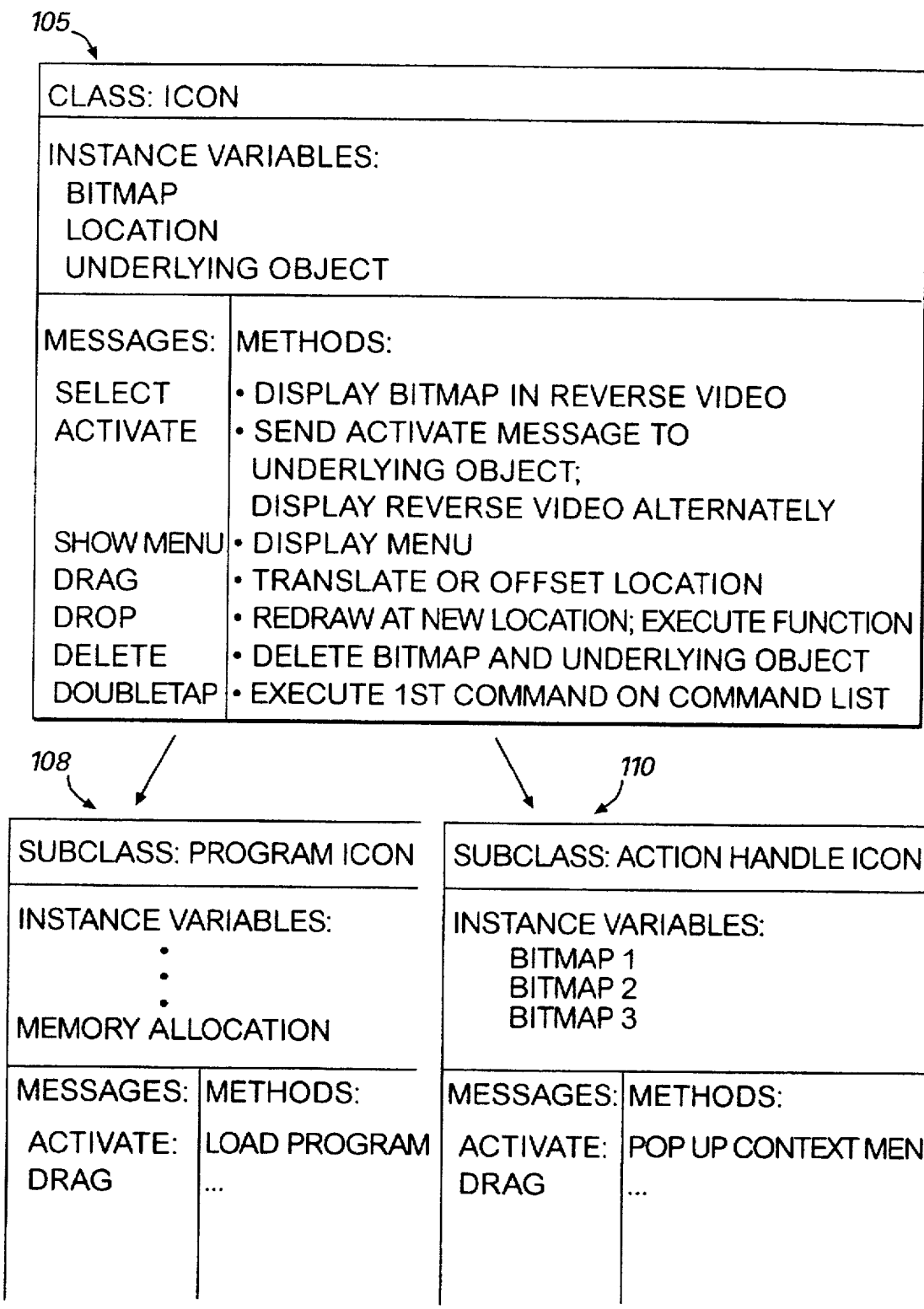
FIG. 13 is a table illustrating an exemplary Icon class of objects with associated instance variables, messages, and methods, with corresponding subclasses of Program Icon and Action Handle Icon, in accordance with the invention.

For example, and looking at FIG. 13, suppose the programmer wants to create a class to represent icons displayed on the display screen. This is shown as the Class: Icon 105. The instance variables might include a Bitmap (which is associated with a graphic image displayed on the screen), a Location (which is the x-y coordinates of the icon relative to the display screen), and an Underlying Object (which is another object that can be accessed or controlled by interacting with the icon, for example, an application program that is activated if the icon is clicked on).

Exemplary messages that could be sent to a member (or instance) of the Icon class might include Select, Activate, ShowMenu, Drag, Drop, Delete, and DoubleTap. The programmer defines various steps of actions comprising computer program steps to correspond to each of these methods. For example, in response to a Select message, the programmer may include program steps that causes the display of the Bitmap in reverse video on the display screen. Similarly, in response to a Activate message, the programmer might provide commands to send a Activate message to an Underlying Object, and then display the Bitmap in reverse video and normal video in rapid succession to indicate visually that an activation process is underway. A ShowMenu message might cause the display of a context menu. A Drag message might cause translation or offset of the location of the Bitmap relative to the display screen. A Drop message might cause an action to take place that is appropriate for a location at which an object is dropped, e.g. merely redrawing the icon at another screen location, or, if an object's icon is dropped atop a printer icon, printing that object's data. A Delete message might cause deletion of the Bitmap from the display screen, as well as of the Underlying Object (which would result in freeing up memory). A DoubleTap message might cause execution of the first command on a command list associated with the icon. Other messages and methods will occur to those skilled in the art.

Still referring to FIG. 13, after a programmer has been provided with or created program code for an Icon class that carries out methods corresponding to messages, he or she can then use the Icon class to create subclasses. Consider for example the Icon subclasses in FIG. 13, Program Icon 108 and Action Handle Icon 110. Both of these subclasses inherit all the instant variables from the Icon class. Each class, however, may define new instance variables and each subclass can override certain methods. For example, the Program Icon 108 may include a Memory Allocation instance variable that stores data corresponding to the desired memory utilized by the Underlying Object, which is another computer program.

Similarly, the Action Handle Icon subclass 110 will include additional Bitmap instance variables, e.g. Bitmap1, Bitmap2, Bitmap3, corresponding to different types of static action handles and drag icons that are displayed in response to various conditions in accordance with the invention.

Each of these subclasses Program Icon 108 and Action Handle Icon 110 responds differently to an Activate Message. The Program Icon responds to an Activate Message by loading the associated program (the Underlying Object), while the Action Handle Icon responds to an Activate Message by popping up the context menu, as has been described elsewhere herein.

As long as the objects are members of any of the associated Icon classes, they can be sent messages that are common to them all and the object will respond properly. The ability to send the same message to objects of different classes or subclasses is called "polymorphism". If the programmer needs to create a different kind of Icon, all he or she needs to do is define a subclass of Icon (by copying or duplicating the program code previously written for the Icon class of objects) and override such methods and provide additional instance variables as are required.

With the foregoing background in mind, it will now be appreciated that the present invention is preferably made with object-oriented programming techniques. A complete discussion of all the possible objects that could be implemented in a computer program employing the teachings of the invention is beyond the scope of the invention and unnecessary for the skilled artisan. To enable the skilled artisan to carry out the invention, we will concentrate the remaining discussion on the various objects that will be constructed in accordance with the invention.

Figure 14:
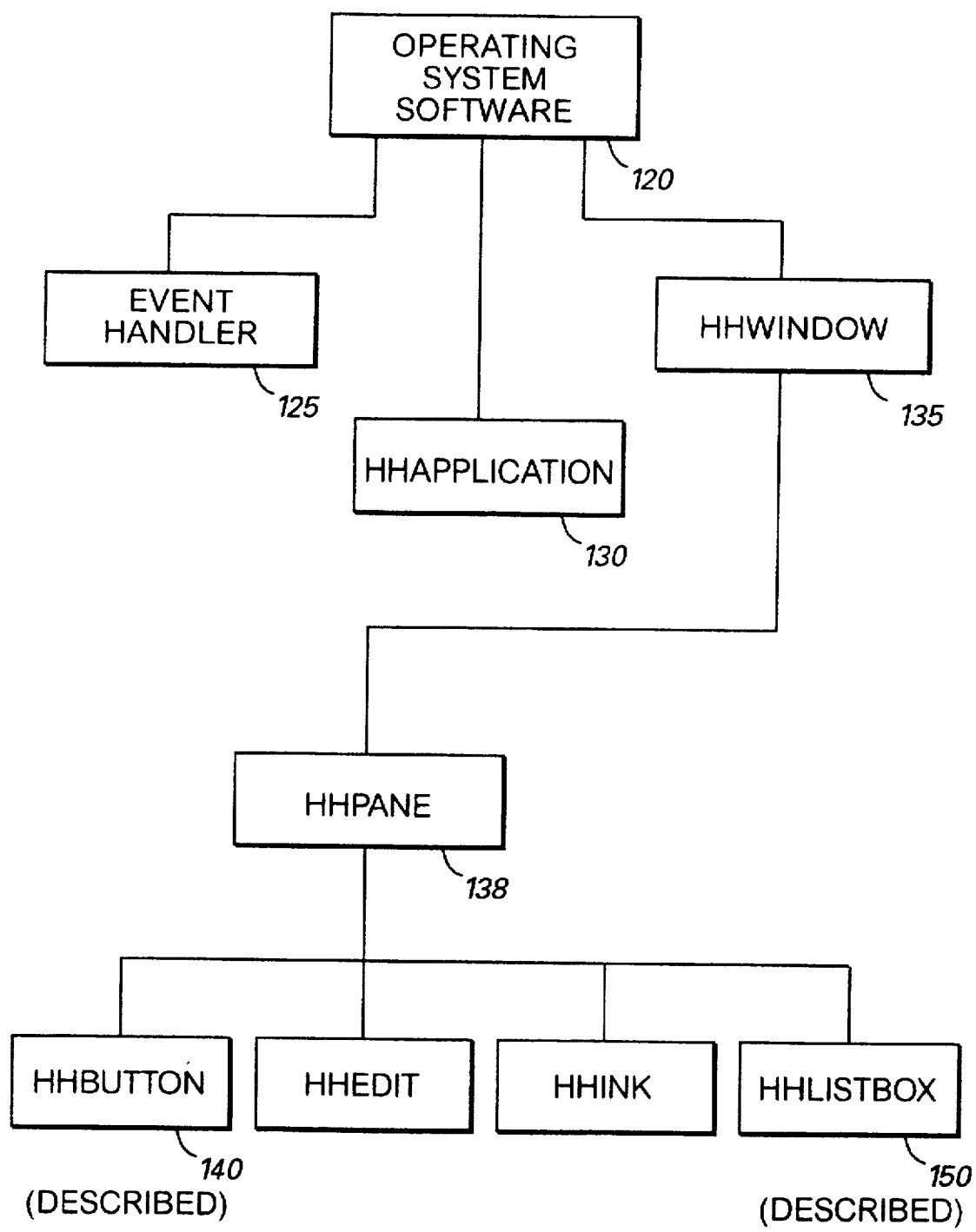
FIG. 14 is a table illustrating a hierarchy of object classes utilized in constructing a computer program that implements the preferred embodiment of the present invention.

FIG. 14 illustrates exemplary classes and relationships between classes that are provided in the present invention to implement action handles in accordance with the present invention. Discussion will not be provided of classes that are shown as the operating system object 120, the event handler object 125, a program application denominated HH APPLICATION 130, and a window object HHWINDOW 135. These and other objects are created by the programmer to write computer program code for a particular application. For purposes of the present invention, it will be understood that:

- an event handler object 125 receives user input such as a tap, click, or drag, and translates the user input into appropriate messages such as Tap, Click, or Drag, and provides these messages to the operating system 120.
- the operating system object 120 coordinates the resources of the computer system such as the event handler, disk drives, display screen, etc. It receives messages from various underlying objects, and passes messages back and forth between objects as appropriate.
- an HHAPPLICATION object 130 is an object that implements methods for a particular user purpose or application, for example, a Notes HHAPPLICATION object would handle storage, retrieval, and display of notes entered by a user.
- an HHWINDOW object 135 is an object that handles display of data in a window on a display screen. Intuitively, a "window" object represented by a member of the HHWINDOW class corresponds to any type of window that can be displayed, in the abstract, on the display screen.

an HHPANE object 138 is a subclass of HHWINDOW object that displays a selected subset of data on a display screen in a smaller "pane", e.g. merely a range of selected text, or a user control button. A member of the subclass HHPANE can be a subwindow such as a dialog box, a button, or other species of a window that can be displayed on a display screen.

a HHBUTTON object 140 is a subclass of HHPANE object that comprises a user control. An action handle is an HHBUTTON type object.

a HHLISTBOX object 150 is a subclass of HHPANE object that comprises a displayed list of data items. A HHLISTBOX object has a pop-up or context menu that is displayed in response to a tap on an action handle.

From the foregoing, it will be understood that action handles in accordance with the present invention are types of control buttons, HHBUTTON, and these are subclasses of the HHPANE class 138. The discussion which follows provides further information on the nature of the instance variables, messages, and methods required to implement objects that constitute action handles and associated data.

TABLE III below illustrates various events that are handled by the event handler object 125 (FIG. 14), and the messages generated or actions taken. It will be understood that a "click/tap" event comprises a tap or a mouse down action, i.e., the contacting of a stylus with the display screen or the depression of a mouse button. A "drag" event in a pen-based system comprises a contacting of the stylus with the display screen at a first or starting location on the display screen, and movement of the stylus along a path on the display screen while maintaining the stylus in contact with the display screen, followed by lifting the stylus at a desired second or ending location. For a mouse or similar pointing device, a "drag" comprises a mouse down at a first or starting cursor location on the display screen, and movement of the cursor along a path on the display screen while maintaining the mouse button down, followed by releasing the mouse button at a desired second or ending location.

TABLE III

| Event | Location | Action |
|---|---|---|
| click/tap | in action handle | pop up context menu- send |
| drag | in action handle | relocate data object and action handle to new display location at mouse up |
| click/tap | in data object | select data object for text editing or other action appropriate for particular type of data object |
| drag | in data object | no effect, or object defined (e.g. handwriting) |
| click/tap | in window in which action handle and data object appear | activate window if beneath; otherwise nothing |
| drag | in window in which action handle and data object appear | activate window if beneath; otherwise nothing |

It will be further understood that the click/tap and drag actions for the window in which an action handle and data object appear are the same actions as those taken in the known WINDOWS™ graphic user interface.

TABLES IV–VI below illustrate various aspects of the HHBUTTON class of objects 140 and HHLISTBOX class of objects 150 that are programmed in accordance with the teachings herein, for implementing action handles in accordance with the present invention. Those skilled in the art will understand that the class definitions provided in the following tables, which should be self explanatory after the foregoing discussion on object-oriented programming, provide an enabling disclosure of the class, instance variables, methods, and notifications unique to the HHBUTTON and HHLISTBOX classes, that differ from classes of a higher hierarchy such as HHPANE and HHWINDOW, for preparing computer program code in accordance with the invention. The tables describe particular display styles for associated graphic images associated with instances of the object, a general description of the class and its functions, messages provided to members of the class and corresponding methods carried out by members of the class, and notification messages provided in response to execution of program code to effectuate the methods described hereinabove.

TABLE IV

HHBUTTON Class Definition

| | |
|---|---|
| Class HHBUTTON | |
| Instance Variables: N/A | |
| Messages & Notifications | Listed below |
| Styles: | |
| HHBS_DRAGICONBMP | Button is an action handle |
| HHBS_DRAGICONBRD | Button is an action handle with a bitmap with a raised border |
| HHBS_DRAGICONBTN | Button is an action handle bitmap with a border. |

Description This is a control object that designates a small rectangular "child" window that represents a button the user can activate by tapping or other user event. There are different types of buttons for different uses, each considered a subclass, e.g. action handles or drag icons.

Drag icons are used to implement a drag handle for data that does not have a drag handle implemented by a control. For example, list boxes, edit controls and note controls all support drag handles, but one could use a drag icon to associate a drag handle with data in a group of controls.

Most push buttons resemble the raised-button look of a numeric keypad. They represent something the user can tap to perform an action or set a state. Regular push buttons are displayed in a depressed position when the user taps it and as in a raised position when released. In contrast, a sticky button remains in the depressed position until the next click.

| Messages: | Methods: |
|---|---|
| HHBM_GETBITMAP | Retrieves the handle to the bitmap displayed on the button |
| HHBM_SETBITMAP | Specifies the handle of the bitmap used to display the bitmap |
| HHBM_GETDRAGICONCMD | Identifies the command invoked when a user taps on the button; Generate the message WM_DRAGDROPREQUEST |
| HHBM_GETDRAGICONCM | Retrieves a list of |

-continued

| | |
|---|---|
| DLST | commands (HCMDLST) to be displayed in a pop up context menu |
| HHBM_SETDRAGICONCMDLST | Specifies the list of commands (HCMDLST) for the action handle that appears when a user tapes the button |

Notifications: The following describes the notification messages that can be sent by a HHBUTTON object to its parent via a WM_COMMAND message

| | |
|---|---|
| HHBN_CLICKED | Sent when the user taps the action handle |
| HHBN_DBLCLK | Indicates that the user double clicked or double tapped on an action handle |
| HHBN_DRAGICONCMD | Sent when the user taps on an action handle pop up menu item. The associated application program must then send the message HHBM_GETDRAGICONCMD to identify the command invoked. |
| HHBN_DRAGICONCMDLST | Allows the application to set or change the command list prior to showing it. This message is sent just before displaying the command list. |
| HHBN_TIMEOUT | Sent to indicate a time out operation, if necessary |
| WM_DRAGDROPREQUEST | Notifies the parent object of action handle that a dragging operation is desired, and to handle a drag and drop operation. |

TABLE V

HHLISTBOX Class Definition

| | |
|---|---|
| Class | HHLISTBOX |
| Instance Variables: | N/A |
| Messages & Notifications | Listed Below |
| Description | The HHListbox control is used to list information for applications, such Address, ToDo, and Calendar. |

The HHLISTBOX class of objects is the class that controls display of a pop-up or context menu of selectable items or commands.

There are two types of selection modes depending on whether the HHLS_EXTENDEDSEL style is set: single-selection mode and extended-selection mode.

In single-selection mode, a pen down event on a list box item removes any previous selection and displays the item on which the pen is positioned as highlighted. The control tracks the pen until the pen is lifted and the new item is selected. That is, only a single item is ever selected at any one time.

When the list box control is in extended-selection mode, placing the pen down on an item removes any previous selection and highlights the item. When the pen is lifted, all items between the item on which the pen was placed and the item on which the pen was lifted become selected (not all items that have been touched).

List box controls with the HHLS_DRAGABLE style support action handles. The application can set a default handheld icon, a handheld icon for a multiple selection and specific handheld icons for each list box item. If no handheld icon is set for an item, the default icon will be used. Though the list box will handle the drawing of the drag icon, the parent has the responsibility of responding to the WM_DRAGDROPREQUEST message in order to support drag and drop from a listbox.

Action handles will be on the left of all lines in a list box item.

Styles The following describes the HHListbox control styles (in the HHLISTBOX class) specified in the dwStyle parameter of the CreateWindow function.

| Style | Description |
|---|---|
| HHLS_DRAGABLE | Specifies that the list box has action handles associated therewith. |
| HHLS_EXTENDEDSEL | Allows a range of items to be selected. |
| HHLS_NOTIFY | Sends an input message to the parent window whenever the user taps or double-clicks a string. |

Messages The following describes the messages that can be sent to an HHListBox control. Again, action handles are synonymous with drag icon.

| Message | Method |
|---|---|
| HHLB_GETDEFAULTDRAGICON | Retrieves information about the default drag handle. |
| HHLB_SETDEFAULTDRAGION | Specifies the default drag icon attributes |
| HHLB_GETDRAGICONCMD | Retrieves the identity of the command chosen from a command list. |
| HHLB-GETDRAGICONCOL | Retrieves the width, in pixels, of the drag icon column. |
| HHLB_SETGRAGICONCOL | Specifies the size, in pixels, of the left column where drag icons are displayed. |
| HHLB_GETITEMDRAGICON | Retrieves the information about the list box drag icon. |
| HHLB_SETITEMDRAGICON | Specifies the drag icon information of the list box item. |

Notifications The following describes the actions of the notification Messages sent by the HHListBox concontrol.

| Notification Messages | Action |
|---|---|
| HHLBN_DRAGICONCMDLST | Sent when the listbox is about to display its command list. |
| HHLBN_DRAGICONCMD | Sent when the listbox has received the WM_COMMAND message from the command list item. |
| HHLBN_ERRSPACE | Sent when list box cannot allocate enough memory to meet a specific request. |

The following TABLE V contains a reference of exemplary control messages that are employed in the preferred embodiment of the present invention.

TABLE VI

Control Messages
HHBM_GETBITMAP

HHBM_GETBITMAP
wParam = 0L; /* not used, must be zero */
lParam = (LPARAM) MAKELPARAM(fPressed); /* pressed or normal */

An application sends an HHBM_GETBITMAP message to retrieve the handle to the bitmap being displayed on the button. Applies only to buttons with the style HHBS_PUSHBUTTON, HHBS_VERTICALBUTTON, HHBS_STICKYBUTTON, HHBS_AUTOSTICKYBUTTON, HHBS_DRAGICONBTN and HHBS_DRAGICONBMP.

| Parameters | Pressed |
|---|---|
| | For HHBS_DRAGICONBMP and HHBS_DRAGICONBTN styles, determines whether to retrieve the bitmap used for the pressed or non-pressed version of the button. Zero returns the non-pressed version. |
| Return Value | The return value is the handle to the bitmap if one exists for the button, else NULL. The return value is always NULL for buttons that do not have the right style. For HHBS_DRAGICONBMP and HHBS_DRAGICONBTN, if the low-order word of lParam is non-zero, it will retrieve the presses version of the bitmap. HHBM_SETBITMAP does the same to set it. |

HHBM_GETDRAGICONCMD

HHBM_GETDRAGICONCMD
wParam = 0;        /*not used, must be zero */
lParam = 0L;       /*not used, must be zero */

This message identifies the command invoked when the user taps on a control with the button style HHBS_DRAGICONBTN, HHBS_DRAGICONBMP, or HHBS_DRAGICONBRD. An application sends an HHBM_GETDRAGICONCMD message during the processing of the HHBN_DRAGICONCMD notification to retrieve the command id of the command list item picked by the user.

| Parameters | This message has no parameters |
| Return | Value Returns the command ID, or zero. |

HHBM_GETDRAGICONCMDLST

HHBM_GETDRAGICONCMDLST
wParam = 0;        /*not used, must be zero */
lParam = 0L;       /*not used, must be zero */

An application sends HHBM_SETDRAGICONCMDLST to a button with style HHBS_DRAGICONBTN, HHBS_DRAGICONBMP, or HHBS_DRAGICONBRD to retrieve the handle of the command list (i.e., context or pop up menu) it will show when the user taps or clicks on it.

| Parameters | This message has no parameters. |
| Return Value | Returns a handle to the command list, or NULL if none is set. ff the style is invalid, NULL is always returned. |

HHBM_SETBITMAP

HHBM_SETBITMAP
wParam = (WPARAM) hBitmap;
       /* handle to bitmap */
lParam = (LPARAM) MAKELPARAM(fPressed);
       /* pressed or normal bitmap */

An application sends a HHBM_SETBITMAP message to set the handle of the bitmap to be used when displaying the action handle. For color bitmaps, the blue bits will appear transparent. Color bitmaps are device dependent.

The bitmap will be centered if there is no text, else it will appear to the left of the text. This applies only to buttons with the styles HHBS_VERTICALBUTTON, HHBS_STICKYBUTTON, HHBS_AUTOSTICKYBUTTON, HHBS_DRAGICONBTN, or HHBS_DRAGICONBMP.

| Parameters | hBitmap |
|---|---|
| | Value of wParam. Handle to the bitmap to be set |
| | fPressed |
| | For HHBS_DRAGICONBTN, or HHBS_DRAGICONBMP, and HHBS_DRAGICONBRD styles, determines whether to set the bitmap used for the pressed or non-pressed version of the button. Zero sets the non-pressed version. |
| Return Value | The return value is TRUE for a successful setting, else FALSE. |

HHBM SETDRAGICONCMDLST

HHBM_SETDRAGICONCMDLST
wParam = hcmdlst;
lParam = 0L;       /*not used, must be zero */

An application sends HHBM_SETDRAGICONCMDLST to a button with style HHBS_DRAGICONBTN or HHBS_DRAGICONBMP to set the handle of the command list it will show when the user taps or clicks on it.

| Parameters | hcmdlst |
|---|---|
| | Value of wParam. Specifies the handle of the command list to be used |
| Return Value | Returns a nonzero if set, or a 0 for an invalid style. |

HHEM_CHECKDRAGICON

HHBM_CHECKDRAGICON
wParam = 0;        /*not used, must be zero */
lParam = 0L;       /*not used, must be zero */

An application sends an HHEM_CHECKDRAGICON message to cause the control to update its drag icon if needed.

| | |
|---|---|
| Parameters | This message has no parameters |
| Return Value | None |

HHLB_GETDEFAULTDRAGICON

```
HHBM_GETDEFAULTDRAGICON
wParam = 0;              /*not used, must be zero */
lParam = (LPARAM)lplbdragicon;
                         /*ptr. to lbdragicon structure */
```

An application sends the HHLB_GETDEFAULTDRAGICON message to retrieve the drag icon information for the default drag icons for the list box. Sending this message causes the lbdragicon structure specified by the lParam to be filled

| | |
|---|---|
| Parameters | lplbdragicon<br>Specifies a long pointer to a<br>LBDRAGICON structure, to<br>fill with default drag icon<br>information.<br>typedef struct tagLBDRAGICON<br>{<br>HBITMAP hbmUp;<br>HBITMAP hbmDown;<br>LBDRAGICON;<br>} |
| Return Value | Returns HHLB_OKAY if the structure was filled in with the default drag icon information. It returns HHLB_ERR if an error occurs or if the listbox is without the style HHLS_DRAGABLE. |

HHLB_GETDRAGICONCMD

```
HHBM_GETDRAGICONCMD
wParam = 0;              /*not used, must be zero */
lParam = 0L;             /*not used, must be zero */
```

An application sends an HHLB_GETDRAGICONCMD message to retrieve the command id of the item selected by the user from the command list. This message is only valid during processing of the HHLBN_DRAGICONCMD notification

| | |
|---|---|
| Parameters | This message has no parameters. |
| Return Value | Returns the ID of the command list item, or HHLB_ERR in a listbox without the style HHLS_DRAGABLE. |

HHLB_GETDRAGICONCOL

```
HHBM_GETDRAGICONCOL
wParam = 0;              /*not used, must be zero */
lParam = 0L;             /*not used, must be zero */
```

An application sends an HHLB_GETDRAGICONCOL message to retrieve the size, in pixels, of the column that displays icons on the left side of a listbox.

| | |
|---|---|
| Parameters | This message has no parameters. |
| Return Value | Returns the width of the column on the left side of the list box to show drag icons in a listbox with the style HHLS_DRAGABLE, or else HHLB_ERR. |

HHLB_GETITEMDRAGICON

```
HHBM_GETITEMDRAGICON
wParam = index;     /*not used to item */
```

-continued

```
lParam = (LPARAM)lplbdragicon;   /*pnt. to lbdragicon
structure */
```

An application sends the HHLB_GETITEMDRAGICON message to retrieve the handheld icon information of the listbox item in a listbox with the HHLS_DRAGGABLE style

| | |
|---|---|
| Parameters | index<br>Specifies the zero-based index of the<br>item's handle to be retrieved.<br>lplbdragicon<br>Specifies a long pointer to a<br>LBDRAGICON structure to be filled.<br>typedef struct tagLBDRAGICON<br>{<br>HBITMAP hbmUp;<br>HBITMAP hbmDown;<br>LBDRAGICON;<br>} |
| Return Value | Returns the height, in pixels, of a listbox item. |

HHLB_SETDEFAULTDRAGICON

```
HHBM_SETDEFAULTDRAGICON
wParam = 0;              /*not used, must be zero */
lParam = (LPARAM)l;plbdragicon;
                         /*ptr. to lbdragicon structure */
```

An application sends the HHLB_SETDEFAULTDRAGICON message to set the default drag icons used by the list box to the bitmaps in the specified lbdragicon structure.

| | |
|---|---|
| Parameters | lplbdragicon<br>Long pointer to a LBDRAGICON<br>structure or NULL for the item to<br>use the default icon.<br>typedef struct tagLBDRAGICON<br>{<br>HBITMAP hbmUp;<br>LBDRAGICON;<br>} |
| Return Value | Returns HHLB_OKAY if default drag icon 15 set, or else HHLB_ERR if an error occurred in a listbox without the style HHLS_DRAGABLE. |

HHLB_SETDRAGICONCOL

```
HHLB_SETDRAGICONCOL
wParam = (WPARAM)colwidth;   /* new width of
                              drag icon column */
lParam = 0L;                 /* not used, must be zero */
```

An application sends an HHLB_SETDRAGICONCOL message to set the size, in pixels, of the column that displays drag icons on the left side of a listbox.

| | |
|---|---|
| Parameters | colwidth<br>Value of wParam.. The width, in pixels, of the new width of the drag icon column. |
| Return Value | Returns the width of the column on the left side of the listbox to show drag icons in a listbox with the style HHLS_DRAGABLE, or else HHLB_ERR. |

HHLB_SETITEMDRAGICON

```
HHLB_SETITEDRAGICON
wParam = index;        /* index to item */
lParam = (LPARAM)lpLbdragicon;
                       /* ptr to lbdragicon struct */
```

An application sends the HHLB_SETITEMDRAGICON message to set the handheld icon information of a list box item's icon. The list box must have the style HHLS_DRAGGABLE set.

| Parameters | index |
|---|---|
| | Specifies the zero-based index of the item |
| typedef struct tagLBDRAGICON | |
| { | |
| HBITMAP hbmUp; | |
| HBITMAP hbmDown; | |
| LBDRAGICON; | |
| } | |
| Return Value | The return value is 0 or HHLB_ERR if an error occurred |

Notification Messages

This section contains a reference of notification messages that are employed in the preferred embodiment of the present invention.

HHBN_DRAGICONCMD

The HHBN_DRAGICONCMD notification message is sent by buttons with the button style HHBS_DRAGICONBTN or HHBS_DRAGICONBMP. It indicates that the control has just received a WM_COMMAND from its command list indicating that the user has just picked a command list item. The application can query which command item was picked by sending the HHBM_GETDRAGICONCMD message.

| Parameters | index |
|---|---|
| | Specifies the zero-based index of the item |
| | lplbdragicon |
| | Long pointer to a LBDRAGICON structure or NULL for the item to use the default icon. |
| typedef struct tagLBDRAGICON | |
| { | |
| HBITMAP hbmUp; | |
| HBITMAP hbmDown; | |
| } LBDRAGICON; | |
| Return Value | The return value is 0 or HHLB_ERR if an error occurred. |

HHBN_DRAGICONCMDLST

The HHBN_DRAGICONCMDLST notification message is sent to the application to allow it to set or change the command list prior to showing it. This message is sent by a control with button style HHBS_DRAGICONBTN or HHBS_DRAGICONBMP.

| Parameters | wParam |
|---|---|
| | Specifies the idenfifier of the button |
| | lParam |
| | Specifies the handle of the control box in the low-order word, and specifies the HHBN_DRAGICONCMDLST notification message in the high-order word. |

HHLBN_DRAGICONCMD

This notification message is sent by a listbox with the style HHLS_DRAGABLE. It indicates that the user has picked an item from the listbox's command list. The application can query the command identity of the selected command list item by sending an HHLB_GETDRAGICONCMD.

| Parameters | wParam |
|---|---|
| | Specifies the identifier of the button |
| | lParam |
| | Specifies the handle of the list box in the low-order word, and specifies the HHBN_DRAGICONCMD notification message in the high-order word. |

HHLBN_DRAGICONCMDLST

This notification message is sent by a listbox with the style HHLS_DRAGABLE. It indicates that the listbox is about to display its command list. The application can find out what listbox items are associated with the active drag icon by sending an HHLB_GETDRAGICONITEMS message to the listbox. If necessary, modify the command list associated with the list box by using the HHLB_GETCMDLST and HHLB_SETCMDLST messages.

| Parameters | wParam |
|---|---|
| | Specifies the idenfifier of the button |
| | lParam |
| | Specifies the handle of the list box in the low-order word, and specifies the HHBN_DRAGICONCMDLST notification message in the high-order word. |

It will now be understood that the present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than by the foregoing description.

What is claimed is:

1. In a computer controlled display system having a display coupled to a central processing unit (CPU) for displaying images, a method for displaying and controlling actions relating to a data object displayed on the display, comprising the steps of:

generating a graphic image associated with the data object on the display;

generating a graphic image of an action handle proximate to the data object;

providing an activatable region on the display associated with the action handle graphic image;

in response to the user's positioning of a pointer on the display with a pointing control device operatively associated with the CPU, providing a signal to the CPU upon correspondence of the pointer with the activatable region of the action handle;

in response to a signal indicative of a first type of interaction between the pointer and the activatable region associated with the action handle, displaying at least one selectable command relating to the data object in a context menu including the at least one selectable command; and in response to signal indicative of a second type of interaction between the pointer and the activatable region associated with the action handle, moving the graphic image of the data object on the display.

2. The method of claim 1, wherein the first type of interaction is a tap.

3. The method of claim 1, wherein the second type of interaction is a drag.

4. The method of claim 1, wherein the step of displaying at least one selectable command comprises:

displaying a plurality of selectable commands in the context menu.

5. The method of claim 1, further comprising the steps of:

providing an activatable second region in the context menu on the display associated with the selectable command; and in response to interaction between the second region and the pointer, executing a computer command corresponding to the selectable command.

6. The method of claim 5, wherein the interaction between the pointer and the second region comprises a tap.

7. The method of claim 1, wherein the step of moving the graphic image of the data object on the display comprises a drag-and-drop operation.

8. The method of claim 1, wherein the step of moving the graphic image of the data object on the display comprises:

moving the graphic image of the action handle on the display during a dragging operation from a first position to a second position on the display;

in response to a release command provided at the second position on the display, moving the graphic image of the data object to a new position on the display associated with the second position.

9. The method of claim 1, wherein the data object is a data item associated with a predetermined application program.

10. The method of claim 9, wherein the data item is a selected string of text associated with a text processing application program.

11. The method of claim 1, wherein the display system includes a direct pointing device for providing signals to the CPU.

12. A computer controlled display system, comprising:

a central processing unit (CPU);

a memory coupled to said CPU for storing programs and data;

a graphic display coupled to said CPU for displaying information;

a pointing device coupled to said CPU for allowing an operator to point to items displayed on said display and for providing signals to said CPU indicative of predetermined actions;

said CPU being operative to:

store data corresponding to a data object in said memory;

display a data object graphic image associated with said data object on said display;

display an action handle proximate to said data object graphic image on said display, said action handle comprising a predetermined activatable region on said display associated with said action handle;

in response to a signal from said pointing device indicative of a first type of interaction between said pointing device and said activatable region of said action handle, display at least one selectable command operatively associated with said data object in a context menu including the at least one selectable command; and in response to a signal from said pointing device indicative of a second type of interaction between said pointing device and said activatable region of said action handle, reposition said data object graphic image on said display.

13. The system of claim 12, wherein said first type of interaction between said pointing device and said activatable region comprises a tap.

14. The system of claim 12, wherein said second type of interaction is a drag.

15. The system of claim 12, wherein the context menu on the display includes a plurality of selectable commands.

16. The system of claim 12, wherein said CPU is further operative for:

providing an activatable second region on the display associated with said selectable command; and in response to interaction between the second region and said pointing device, executing instructions corresponding to said selectable command.

17. The system of claim 16, wherein said interaction between said pointing device and said activatable second region comprises a tap.

18. The system of claim 12, wherein said CPU operation of repositioning said data object graphic image on said display comprises a drag-and-drop operation.

19. The system of claim 12, wherein said CPU operation of repositioning said data object graphic image on said display comprises:

moving said graphic image of said action handle on said display during a dragging operation from a first position to a second position on said display;

in response to a release command provided at said second position, moving said graphic image of said data object to a new position on said display associated with said second position.

20. The system of claim 12, wherein said data object is a data item associated with a predetermined application program.

21. The method of claim 20, wherein said data item is a selected string of text associated with a text processing application program.

22. The method of claim 20, wherein said data item comprises a calendar entry associated with a calendar application program.

23. In a computer controlled display system having a display coupled to a central processing unit (CPU) for displaying images, a method for displaying and controlling actions relating to a selected text string displayed on the display, comprising the steps of:

generating a graphic image of a string of text on the display;

in response to selection of predetermined selected text within the string of text, generating a graphic image of an action handle in a region proximate to the predetermined selected text;

providing an activatable region on the display associated with the action handle;

in response to a user's positioning of a pointer on the display to the activatable region associated with the action handle using a pointing control device operatively associated with the CPU, providing signals to the CPU indicative of correspondence of the pointer with the action handle;

in response to a signal indicative of a first type of interaction between the pointer and the activatable region associated with the action handle, displaying at least one selectable command relating to the predetermined selected text in a context menu including the at least one selectable command; and in response to a signal indicative of a second type of interaction between the pointer and the activatable region associated with the action handle, moving the predetermined selected text on the display.

24. The method of claim 23, wherein the step of displaying at least one selectable command comprises:

displaying a plurality of selectable commands in the context menu.

25. The method of claim 24, wherein the context menu comprises a list of a predetermined plurality of selectable commands, and wherein the selectable commands at the beginning of the list are of a first, application specific type and wherein the commands at the end of the list are of a second, operating system specific type.

26. The method of claim 23, further comprising the steps of:

providing an activatable second region on the display associated with the selectable command; and in response to interaction between the second region and the pointer, executing a computer command corresponding to a particular selectable command.

27. The method of claim 26, wherein the interaction between the pointer and the second region comprises a tap.

28. The method of claim 23, wherein the step of moving the predetermined selected text on the display comprises a drag-and-drop operation.

29. The method of claim 23, wherein the step of moving the predetermined selected text on the display comprises:

moving the action handle on the display during a dragging operation from a first position to a second position on the display;

in response to a release command provided at the second position on the display, moving the predetermined selected text to a new position on the display associated with the second position.

30. The method of claim 23, wherein the string of text is displayed on the display in a scrollable window, and further comprising the steps of in response to a signal indicative of the second type of interaction between the pointer and the action handle and movement of the action handle to a boundary of the scrollable window, scrolling the text in the scrollable window; and continuing to display the action handle pinned to the boundary of the window during scrolling of the text.

* * * * *